US010429170B2

(12) United States Patent
Hendon et al.

(10) Patent No.: US 10,429,170 B2
(45) Date of Patent: Oct. 1, 2019

(54) HIGH-SENSITIVE SWEPT-SOURCE OPTICAL COHERENCE TOMOGRAPHY SYSTEM AND METHODS OF USE THEREOF

(71) Applicant: The Trustees of Columbia University in the City of New York, New York, NY (US)

(72) Inventors: Christine Hendon, Riverdale, NY (US); Xinwen Yao, New York, NY (US); Yuye Ling, New York, NY (US)

(73) Assignee: THE TRUSTEES OF COLUMBIA UNIVERSITY IN THE CITY OF NEW YORK, New York, NY (US)

( * ) Notice: Subject to any disclaimer, the term of this patent is extended or adjusted under 35 U.S.C. 154(b) by 83 days.

(21) Appl. No.: 15/531,230

(22) PCT Filed: Nov. 25, 2015

(86) PCT No.: PCT/US2015/062636
§ 371 (c)(1),
(2) Date: May 26, 2017

(87) PCT Pub. No.: WO2016/086112
PCT Pub. Date: Jun. 2, 2016

(65) Prior Publication Data
US 2017/0356734 A1 Dec. 14, 2017

Related U.S. Application Data

(60) Provisional application No. 62/084,648, filed on Nov. 26, 2014, provisional application No. 62/171,390, filed on Jun. 5, 2015.

(51) Int. Cl.
*G01B 9/02* (2006.01)
*G02F 1/355* (2006.01)
(Continued)

(52) U.S. Cl.
CPC ..... *G01B 9/02004* (2013.01); *G01B 9/02041* (2013.01); *G01B 9/02091* (2013.01);
(Continued)

(58) Field of Classification Search
CPC ............ G01B 9/02004; G01B 9/02041; G01B 9/02091; G02F 1/3544; G02F 1/3558; G02F 1/3775; G02F 2001/3548
See application file for complete search history.

(56) References Cited

U.S. PATENT DOCUMENTS 4,980,566 A   12/1990  Heilweil
5,451,785 A    9/1995  Faris
(Continued)

OTHER PUBLICATIONS

Powers, P. E. et al. "Continuous tuning of a continuous-wave periodically poled lithium niobate optical parametric oscillator by use of a fan-out grating design". Optics Letters, vol. 23, No. 3, Feb. 1, 1998, pp. 159-161. (Year: 1998).*
(Continued)

*Primary Examiner* — Michael A Lyons
(74) *Attorney, Agent, or Firm* — Hunton Andrews Kurth LLP

(57) ABSTRACT

An exemplary system can be provided which can include, for example, a plurality of source arrangements configured to provide a plurality of electro-magnetic radiations to at least one of at least one sample or at least one reference structure, a first arrangement configured to receive a first radiation(s) from the reference structure(s), a second arrangement configured to receive a second radiation(s) from the sample(s), where a portion(s) of the second radiation(s) can be in an invisible spectrum, a third arrangement configured to combine the first radiation(s) and the second radiation(s) into a third radiation(s), and a fourth arrangement configured to convert the third radiation(s) into a
(Continued)

further radiation in a visible spectrum based on the at least one portion.

26 Claims, 26 Drawing Sheets

(51) Int. Cl.
  *G02F 1/377* (2006.01)
  *G02F 1/35* (2006.01)
(52) U.S. Cl.
  CPC .......... *G02F 1/3544* (2013.01); *G02F 1/3558* (2013.01); *G02F 1/3775* (2013.01); *G02F 2001/3548* (2013.01)

(56) References Cited

U.S. PATENT DOCUMENTS

| | | | |
|---|---|---|---|
| 5,491,524 A * | 2/1996 | Hellmuth | A61B 3/102 351/205 |
| 6,445,491 B2 * | 9/2002 | Sucha | G01N 21/4795 359/326 |
| 6,969,858 B2 | 11/2005 | Hillenbrand et al. | |
| 8,446,580 B2 * | 5/2013 | Cerullo | G01J 3/44 356/301 |
| 2007/0018103 A1 | 1/2007 | Decamp et al. | |
| 2008/0228073 A1 * | 9/2008 | Silverman | A61B 5/0066 600/437 |
| 2010/0141954 A1 | 6/2010 | Kobayashi | |
| 2010/0271635 A1 * | 10/2010 | Resch | G02F 1/21 356/477 |
| 2011/0279821 A1 | 11/2011 | Brennan et al. | |
| 2012/0062983 A1 | 3/2012 | Imeshev et al. | |
| 2014/0098829 A1 | 4/2014 | Lewandowski et al. | |

OTHER PUBLICATIONS

International Search Report for International Application No. PCT/US2015/062636 dated Mar. 11, 2016.
International Written Opinion for International Application No. PCT/US2015/062636 dated Mar. 11, 2016.

* cited by examiner

HIGH-SENSITIVE SWEPT-SOURCE OPTICAL COHERENCE TOMOGRAPHY SYSTEM AND METHODS OF USE THEREOF

CROSS REFERENCE TO RELATED APPLICATIONS

This application is U.S. national phase under 35 U.S.C. § 371 of International Patent Application No. PCT/US2015/062636, filed Nov. 25, 2015, and relates to and claims the benefit and priority from U.S. Provisional Patent Application Nos. 62/084,648, filed on Nov. 26, 2014, and 62/171,390, filed on Jun. 5, 2015, the entire disclosures of which are incorporated herein by reference in their entireties.

STATEMENT REGARDING FEDERALLY SPONSORED RESEARCH

This invention was made with government support under Grant No. EEE-1342273, awarded by the National Science Foundation. The government has certain rights in the invention.

FIELD OF THE DISCLOSURE

The present disclosure relates generally to medical imaging, and more specifically, to exemplary embodiments of an exemplary high-sensitive swept-source ("SS") optical coherence tomography ("OCT") system (e.g., "SS-OCT") and methods of use thereof.

BACKGROUND INFORMATION

An advantage of a conventional SS-OCT system over its spectral domain counterparts can be the high acquisition speed, which makes SS-OCT a promising solution to many real world clinical applications. The acquisition rate of SS-OCT can be mainly limited by the scanning speed of the swept laser source, and the sensitivity of the photodetector, while the acquisition speed of a spectral domain ("SD") OCT system can be bottlenecked by the data acquisition speed of the line sensor, which can be confined by the speed of the circuitry.

Recently, the upper limit of the scanning speed of swept source lasers has been pushed higher and higher. Swept source lasers with about a 200 kHz scanning speed can be common in the market. However, the higher scanning speed has imposed a more demanding requirement on the sensitivity of the photodetectors, since the maximum exposure time of the photodetector can be upper-bounded by the scanning period. Because biomedical samples such as tissues can be of particular interest, which can be highly scattering, shorter exposure time can potentially reduce the signal-to-noise ratio ("SNR") at the detector. Therefore, a highly sensitive sensor can be desired when using a SS-OCT system.

High performance photodetectors in the near infrared ("NIR") range are uncommon. For example, a typical value of an InGaAs avalanche photodetector at about 1300 nm can be around 1.5~2.5 A/W. Conversely, there are plenty of options for photodetectors in the visible range. Silicon avalanche photodetectors can usually achieve a sensitivity as high as about 25 A/W. Other solutions, such as charge-coupled device ("CCD"), may also be available in visible spectrum.

Thus, it may be beneficial to provide an exemplary high-sensitive swept-source optical coherence tomography system and method, which can overcome at least some of the deficiencies described herein above.

SUMMARY OF EXEMPLARY EMBODIMENTS

An exemplary system can be provided which can include, for example, a plurality of source arrangements configured to provide a plurality of electro-magnetic radiations to a sample(s) or a reference structure(s), a first arrangement can be configured to receive a first radiation(s) from a reference structure(s), a second arrangement can be configured to receive a second radiation(s) from a sample(s), where a portion(s) of the second radiation(s) can be in an invisible spectrum. A third arrangement can be configured to combine the first radiation(s) and the second radiation(s) into a third radiation(s), and a fourth arrangement can be configured to convert the third radiation(s) into a further radiation in a visible spectrum based on the portion(s).

In certain exemplary embodiments of the present disclosure, the source arrangements can include a swept-source and/or a broadband source. The source(s) can be or include a laser arrangement. The third arrangement can include a quasi-phase matching apparatus, which can include a fan-out grating configuration. The fan-put grating configuration can be or include at least one periodically poled lithium niobate fan-out grating, which can include at least two periodically poled lithium niobate fan-out gratings. A fifth arrangement can be provided which can be configured to frequency doubling the first radiation(s) and the second radiation(s) prior to the combining of the first radiation(s) with the second radiation(s).

A further exemplary embodiment can include, for example, a method for generating an image(s), which can include providing a plurality of electro-magnetic radiations from a plurality of sources to a sample(s) or a reference structure(s), receiving a radiation(s) from an optical coherence tomography system(s), converting a first portion(s) of the radiation(s) provided in an invisible spectrum into a second portion(s) in a visible spectrum, and generating an image based on the further portion(s). The sources can include a swept-source and/or a broadband source. The first portion(s) can be converted into the second portion(s) using a quasi-phase-matching apparatus, which can include a fan-out grating configuration. The fan-put grating configuration can be a periodically poled lithium niobate fan-out grating or multiple periodically poled lithium niobate fan-out grating.

Another exemplary embodiment of the present disclosure can include, for example, a method, which can include providing a plurality of electro-magnetic radiations from a plurality of sources to a sample(s) or at a reference structure(s), receiving a first radiation(s) from a reference structure(s), receiving a second radiation(s) from a sample(s) where a portion(s) of the second radiation(s) can be in an invisible spectrum, combining the first radiation(s) and the second radiation(s) into a third radiation(s), and converting the third radiation(s) into a further radiation in a visible spectrum based on the portion(s). The third radiation(s) can be detected. An image(s) of the sample(s) can be generated generating based on the detected third radiation(s).

In some exemplary embodiments of the present disclosure, the first radiation(s) and the second radiation(s) can be generated using a swept source laser. The third radiation can be an interference between the first radiation(s) and the second radiation(s). The first radiation(s) and the second radiation(s) can be frequency doubled, prior to combining the first radiation(s) with the second radiation(s), using a quasi-phase-matching apparatus, which can include a fan-out grating configuration(s). The fan-out grating configuration can be a periodically poled lithium niobate fan-out grating. A fourth radiation(s) can be received and combined with the first radiation(s) and the second radiation(s) into the third radiation(s). The fourth radiation(s) can be generated using a femtosecond laser, in addition to the first and second radiation(s). The sources can include a swept-source and/or a broadband-source.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which.

Figure 1:
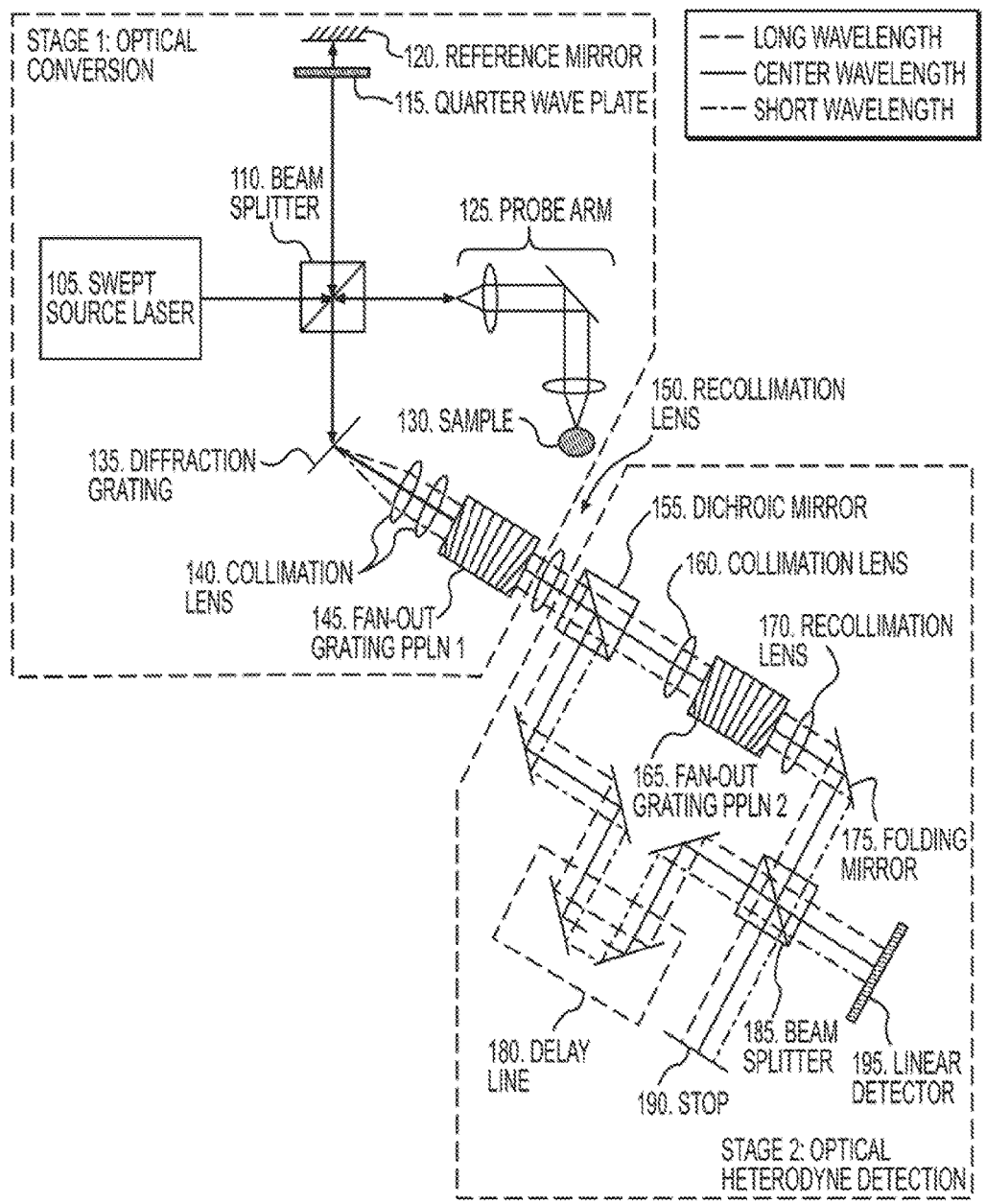
FIG. 1 is a schematic diagram of an exemplary swept-source ("SS") optical coherence tomography ("OCT") system ("SS-OCT") according to an exemplary embodiment of the present disclosure.

Throughout the drawings, the same reference numerals and characters, unless otherwise stated, are used to denote like features, elements, components or portions of the illustrated embodiments. Moreover, while the present disclosure will now be described in detail with reference to the figures, it is done so in connection with the illustrative embodiments and is not limited by the particular embodiments illustrated in the figures and the appended claims.

DETAILED DESCRIPTION OF EXEMPLARY EMBODIMENTS

IR can be beneficial in lessening the scattering when the light can be propagating in the object. However, it can be beneficial to exploit the high performance photodetectors that can be available in the visible range. Therefore, non-linear optical process, such as second harmonic generation ("SHG"), can be a promising solution. For example, SHG can easily convert light from about 1300 nm down to about 650 nm. The SHG can be described by the following:

$$\vec{E}(2\omega) = \vec{X}(2\omega = \omega + \omega)\left[\vec{E}_{pump}(\omega)\vec{E}^*_{pump}(\omega) + \vec{E}_{pump}(\omega)\vec{E}^*_{probe}(\omega) + \vec{E}_{probe}(\omega)\vec{E}^*_{pump}(\omega) + \vec{E}_{probe}(\omega)\vec{E}^*_{probe}(\omega)\right] = X(2\omega = \omega + \omega)$$
$$\left\{|E_{pump}(\omega)|^2 + |E_{probe}(\omega)|^2 + 2Re\left[\vec{E}_{probe}(\omega)\vec{E}^*_{pump}(\omega)\right]\right\} =$$
$$X(2\omega = \omega + \omega)\left\{DC\ terms + 2Re\left[\vec{E}_{probe}(\omega)\vec{E}^*_{pump}(\omega)\right]\right\}$$
(1a)

Eq. 1a has a similar form as that of heterodyne detection except that the resultant signal $\vec{E}(2\omega)$ can now be at a higher frequency, which can enable higher sensitivity in detection.

It can also be beneficial to ensure the conversion efficiency of the process as close to unity as possible, which can benefit from perfect phase matching over the entire spectrum. This can be done by using a fan-out grating periodically poled lithium niobate ("PPLN"), as discussed below.

The exemplary system/apparatus can facilitate a direct boost in axial resolution by a factor of about $\sqrt{2}$ without having to upgrade the light source. The exemplary system/apparatus can also replace the second-harmonic generation from other nonlinear optical process such as optical parametric amplification to amplify the probe signal, and can further increase the SNR of the whole system. The exemplary system, method and computer-accessible medium according to an exemplary embodiment of the present disclosure, can probe the sample with longer wavelengths, which can enable better penetration. The exemplary system/apparatus can also detect the signal within the visible range, which can make full use of better photo-receivers. The exemplary system, method and computer-accessible medium according to an exemplary embodiment of the present disclosure, can be compatible with current SS-OCT systems and can be plugged in as a detector, to a standard system.

The exemplary system, method and computer-accessible medium according to an exemplary embodiment of the present disclosure, has the potential to achieve higher SNR by using optical parametric amplification instead of second-harmonic generation. This can also increase the depth of penetration within the tissue. With an amplification of about 1000×, the depth of field can be increased by approximately 5 times. Although all the examples shown below can be based on free space optics, the methodology is compatible with fiber-based implementation.

FIG. 1 shows a schematic diagram of an exemplary SS OCT system, which illustrates nonlinear conversion and detection. The exemplary system can be divided into to two stages: (i) optical conversion and (ii) optical heterodyne detection. Though other nonlinear process, such as optical parametric amplification, can be used to further boost the signal level, FIG. 1 illustrates an exemplary configuration that applies second-harmonic generation. The linearly polarized beam from the swept-source laser 105 can be split or separated by the beam splitter 110. Part of the light, or other electro-magnetic radiation, can serve as a probe, and the probe arm 125 can focus and raster scan the probe beam on the surface of the sample 130, similar to the sample arm in a conventional SS-OCT. The rest of the light, or other electro-magnetic radiation, can serve as a pump, and can be reflected by the reference mirror 120. The state of polarization of the pump can be rotated by about 90° due to the presence of the quarter wave plate 115 before the pump, and the back-reflected probe beam can recombine the beam at the beam splitter 110. The recombined beam can be angularly dispersed by the diffraction grating 135. The dispersion in angular domain can be translated into spatial domain by collimation lens 140.

After propagating through the fan-out grating PPLN 145, the probe beam can be completely up-converted to a second-harmonic frequency. In some exemplary embodiments of the present disclosure, that fan-out grating PPLN can be replaced by a temperature controlled ordinary PPLN, or any other nonlinear optical crystals. The recollimation lens 150 can be used to collect the output, and the output from the first stage (e.g., optical conversion) can be a mixture of undepleted pump beam at a fundamental frequency, and up-converted probe at a second-harmonic frequency. A dichroic mirror 155 can separate the undepleted pump beam and the up-converted probe. The up-converted probe can be fed into a delay line 180, while the undepleted pump can be frequency doubled by another fan-out grating PPLN 165. Similar to the apparatus above, a pair of collimation lens 160 and recollimation lens 170 can be used, and the depleted pump can be reflected by folding mirror 175. The frequency doubled pump can recombine with the up-converted probe in beam splitter 185, and a spectral interferogram can be formed on linear detector 195. Finally, an optical stop 190 can be placed on the other output port of the beam splitter to absorb the excessive power.

The electric field at the output of the swept source laser can be linearly polarized along the x direction. $E_0(k)$ below can provide the amplitude of the swept-source laser output at spatial frequency k. $\omega$ can provide the temporal frequency of the radiation. Thus, for example:

$$\vec{E}(k,z) = \hat{x}E_0(k)\exp[i(kz-\omega t)] \quad (1b)$$

The electric field of the pump beam when re-entering the beam splitter can be linearly polarized along the y-direction. A factor of 2 can be included due to the double pass of the interferometer-like arrangement. $r_R$ can provide the reflectance of the reference mirror. Thus, for example:

$$\vec{E}_{pump}(k, z) = \frac{\hat{y}}{2} r_R E_0(k)\exp[i(2kz - \omega t)] \quad (2)$$

When the electric filed of the probe beam re-enters the beam splitter, the sample can be modeled as a multi-layer reflector. $r_n$ can provide the reflectance of the $n^{th}$ layer and $\Delta z_n$ can stand for the axial displacement of $n^{th}$ layer. Thus, for example:

$$\vec{E}_{probe}(k, z) = \frac{\hat{x}}{2} E_0(k) \sum_n r_n \exp\{i[2k(z + \Delta z_n) - \omega t]\} \quad (3)$$

The amplitude of the electric field can be proportional to the cross-product of the amplitudes of the pump field and probe field if the fan-out grating PPLN can be designed in a way that only the cross-polarization term can satisfy the quasi-phase-matching condition. All beneficial phase information can be preserved during the nonlinear up-conversion. $\overleftrightarrow{\chi}^{(2)}$ can be a second-order tensor that can provide the nonlinear susceptibility of the PPLN. $\chi_{yij}^{(2)}$ (can be the tensor elements that can correspond to the nonlinear susceptibility in the y direction given the two inputs in the x- and y-direction. Thus, for example:

$$\vec{E}_{up-converted\,probe}(k, z) \propto \overleftrightarrow{\chi}^{(2)} \vec{E}_{pump} \cdot \vec{E}_{probe} = \quad (4)$$
$$\frac{\hat{y}}{4} \chi_{yij}^{(2)} r_R E_0^2(k) \sum_n r_n \exp\{i[2k(2z + \Delta z_n) - 2\omega t]\}$$

Figure 2:
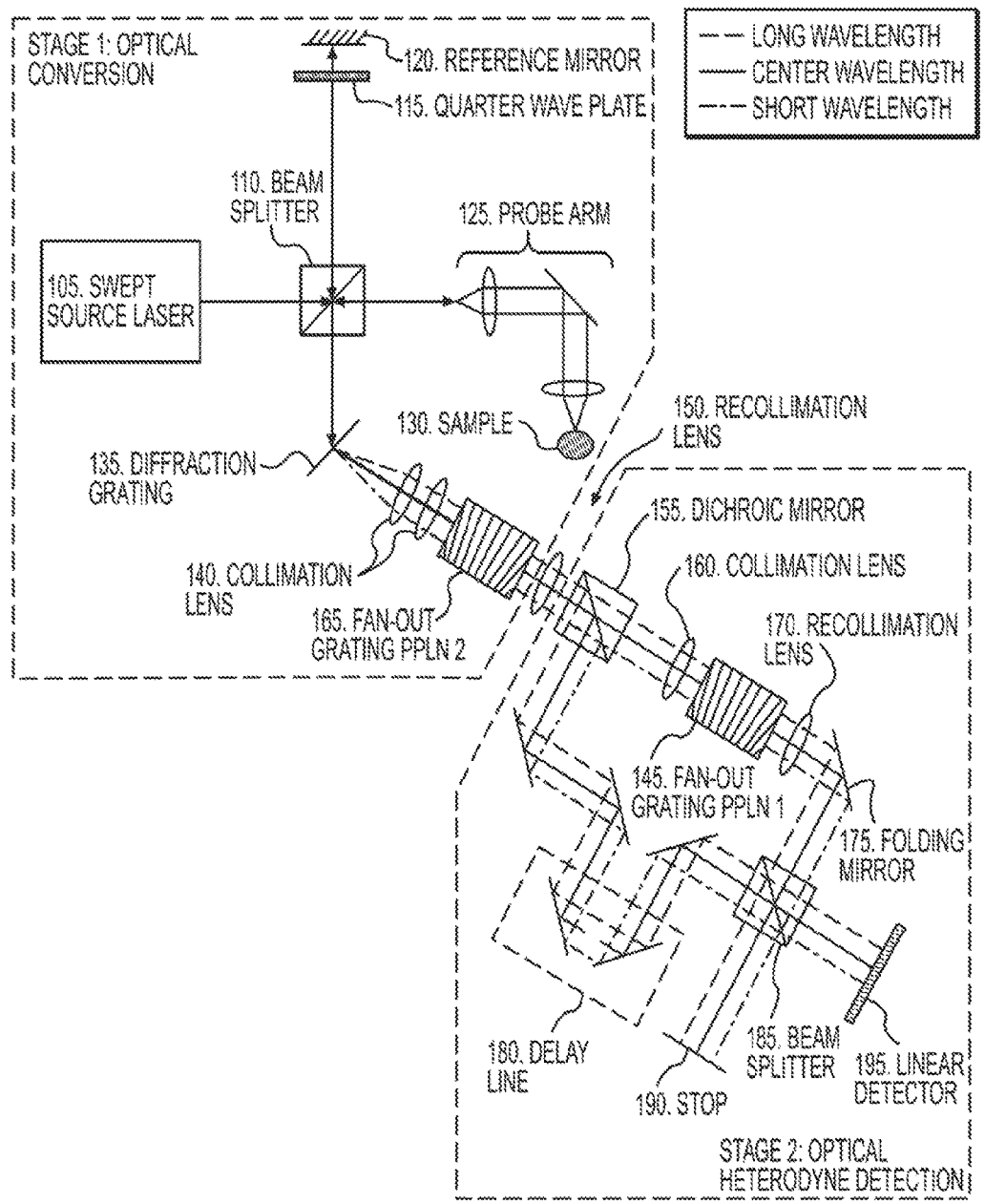
FIG. 2 is a schematic diagram of a further exemplary SS-OCT system according to an exemplary embodiment of the present disclosure.

FIG. 2 is a schematic diagram of a further exemplary SS-OCT system, which illustrates nonlinear conversion and detection with a switched sequence of probe and pump doubling. The further exemplary SS-OCT system illustrated in FIG. 2 can be similar to the exemplary SS-OCT system illustrated in FIG. 1, except that it can be possible to switch the sequence (e.g., location) of the nonlinear process. For example, the location of the two exemplary fan-out grating PPLNs used in FIG. 1 (e.g., fan-out grating PPLN 145 and fan-out grating PPLN 165) can be switched. Thus, the pump beam of the further exemplary SS-OCT system of FIG. 2 can be upconverted, and then the probe beam can be upconverted with the undepleted pump beam. This can produce expected results as long as the pump beam may not be completely depleted during the first process. However, the conversion efficiency of the up-conversion of probe beam may be compromised because the intensity of the pump beam can be weaker than the exemplary SS-OCT system shown in FIG. 1.

Figure 3:
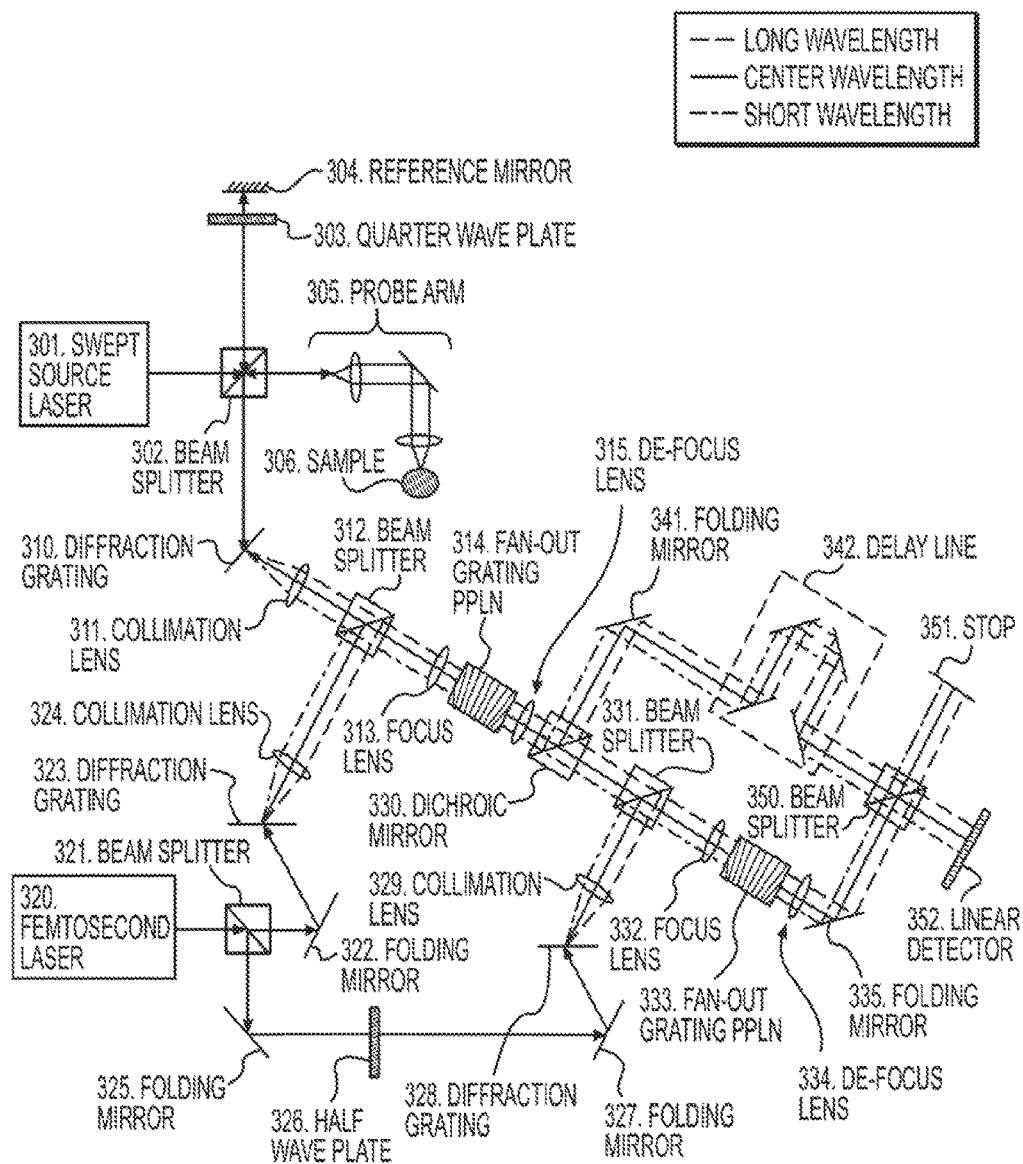
FIG. 3 is a schematic diagram of an even further exemplary SS OCT system according to an exemplary embodiment of the present disclosure.

FIG. 3 is a schematic diagram of an even further exemplary SS-OCT system, which illustrates nonlinear conversion and detection with an additional laser. If an additional laser, such as a femtosecond laser, can be used, an amplified version of the exemplary system can be implemented. Compared with the system described in FIG. 1, the fan-out grating PPLN shown in the even further exemplary SS-OCT system shown in FIG. 3 can be redesigned to enforce optical parametric amplification instead of second-harmonic generation. Therefore, the sample beam of the even further exemplary SS-OCT system shown in FIG. 3 can be substantially amplified by orders of magnitude before being optically heterodyne detected. By applying this exemplary method, the sensitivity of the system can be greatly enhanced, and the penetration depth can be further increased.

As illustrated in the schematic diagram of FIG. 3, the linearly polarized beam from swept-source laser 301 can be split by the beam splitter 302. Part of the light can serve as a sample beam. The probe arm 305 can focus and raster scan the sample beam on the surface of the sample 306 just like the sample arm in a conventional SS-OCT. The rest of the light can serve as a reference, and can be reflected by the reference mirror 304. The state of polarization of the reference can be rotated by 90° due to the presence of the quarter wave plate 303 before the reference and the back-reflected sample beam can recombined at the beam splitter 302. The recombined beam can be angularly dispersed by the diffraction grating 310. The dispersion in angular domain can be translated into spatial domain by collimation lens 311.

The output of the femtosecond laser, which can also be linearly polarized in the x direction, can be split by a beam splitter 321. The transmitted portion can be deflected by a folding mirror 322. The spectrum of the femtosecond laser does not have be the same as that of the swept-source laser. For example, the central wavelength of the femtosecond laser can be smaller than that of the swept-source laser to enable optical amplification. The diffraction grating 323 can angularly disperse the transmitted part of the output from the femtosecond laser, which can be collimated by the collimation lens 324.

The two spatially dispersed beam can be recombined by another beam splitter 312 and can be directed on to the input surface of the fan-out grating PPLN 314. A focus lens 313 can be used to focus the beam to ensure best conversion efficiency. By carefully designing the fan-out grating PPLN, an ultrabroadband quasi-phase-matched optical parametric amplification can be performed. After travelling through the fan-out grating PPLN 314, the sample beam can be completely up-converted, and can be amplified by the transmitted part of the femtosecond pulses. The defocus lens 315 can be used to collect the output. The output from the first fan-out grating PPLN can be a mixture of the reference beam and the amplified up-converted probe at a higher frequency, which can be separated by the dichroic mirror 330. The amplified up-converted probe beam can be reflected by folding mirror 341, and can be fed into a delay line 342, while the pump beam can be focused using focus lens 332, and then optically parametrically amplified by another fan-out grating PPLN 333. The pump beam can be the reflected part of the output from the femtosecond laser. Before being combined with pump beam in the beam splitter 331, it can be reflected by folding mirror 325, and it can then go through a half wave plate 326. Then, it can be reflected by folding mirror 327, and it can be dispersed by a diffraction grating 328 and lens 329. The amplified up-converted reference beam can be de-focused in lens 334, and can be reflected by folding mirror 335 before it and the amplified up-converted sample beam can be recombined in beam splitter 350. A spectral interferogram can be formed on linear detector 352, and optical stop 351 can be placed on the other output port of the beam splitter to absorb the excessive power.

Figure 4:
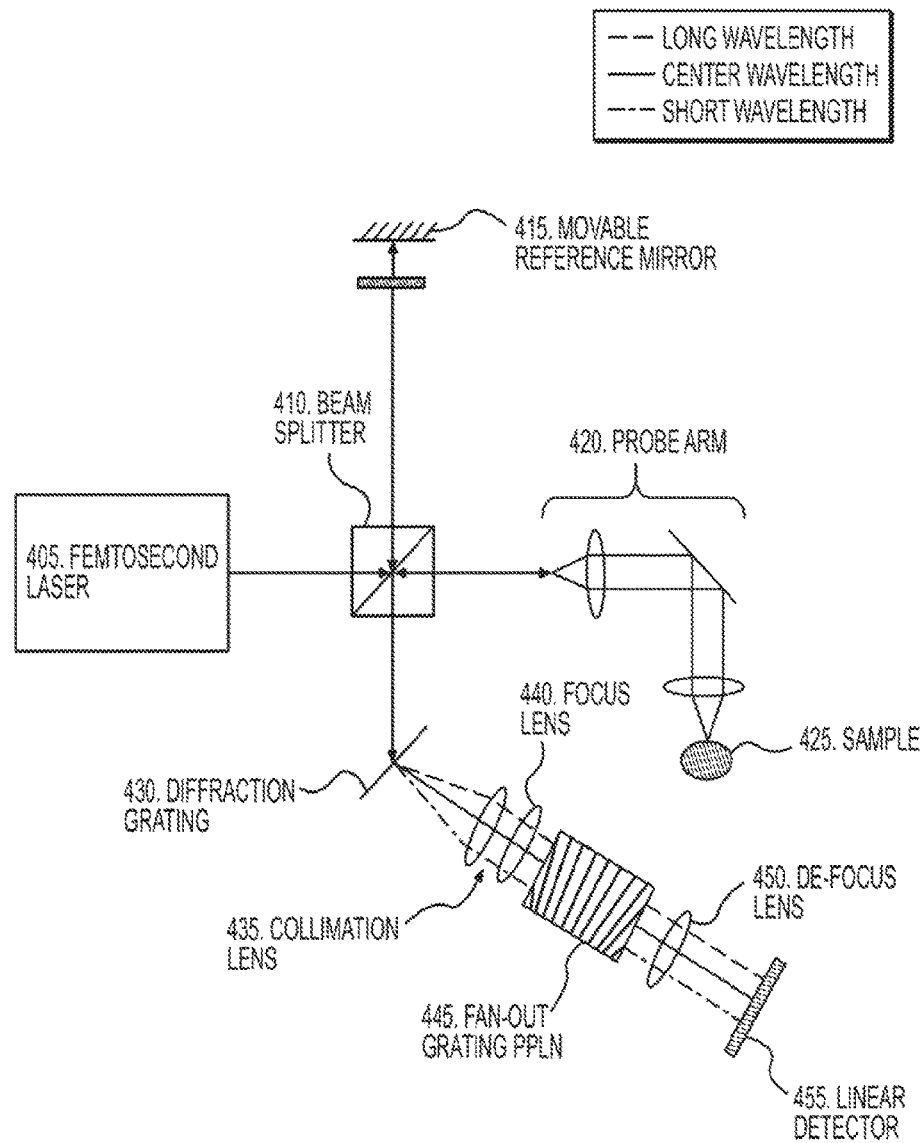
FIG. 4 is a schematic diagram of an exemplary femtosecond laser system according to an exemplary embodiment of the present disclosure.

FIG. 4 is a schematic diagram of an exemplary femtosecond laser system, which illustrates time-domain spectroscopy. Based on the same fan-out grating PPLN, an exemplary time-domain spectroscopic OCT system can be implemented. In a conventional spectroscopic OCT system based on exemplary signal processing methods, such as short time Fourier transform, the axial resolution of the imaging can be reversely proportional to the resolution of the spectroscopic information due the Heisenberg uncertainty principle. However, in the exemplary system/apparatus, according to an exemplary embodiment of the present disclosure, these exemplary parameters can be completely decoupled.

For example, a femtosecond laser 405 can be used as a light source. The beam splitter 410 can split the light into a reference and a sample pulse. The reference pulse can be reflected by a movable reference mirror 415 similar to a conventional TD-OCT system, while the sample pulse can go through the probe arm 420 and can be back scattered by the sample 425. The back scattered sample pulse, and the reflected reference pulse, can be recombined at the beam splitter 410 before being dispersed by the diffraction grating 430. Two lens (e.g., lenses 435 and 440), can be used to collimate and focus the pulses on to the input surface of the fan-out grating PPLN 445. In this exemplary case, the second-harmonic generation may likely only take place when the reference pulse and sample pulse overlay perfect in time, which can be the same as that in a time-gated imaging system. The generated second-harmonic signal can be decoupled by a de-focus lens 450, and can be directly detected by a linear detector 455. Therefore, the axial resolution in the exemplary system can be determined by the pulse width of the laser. Since the pulse can be dispersed, each spectral components can be detected separately.

Figure 5:
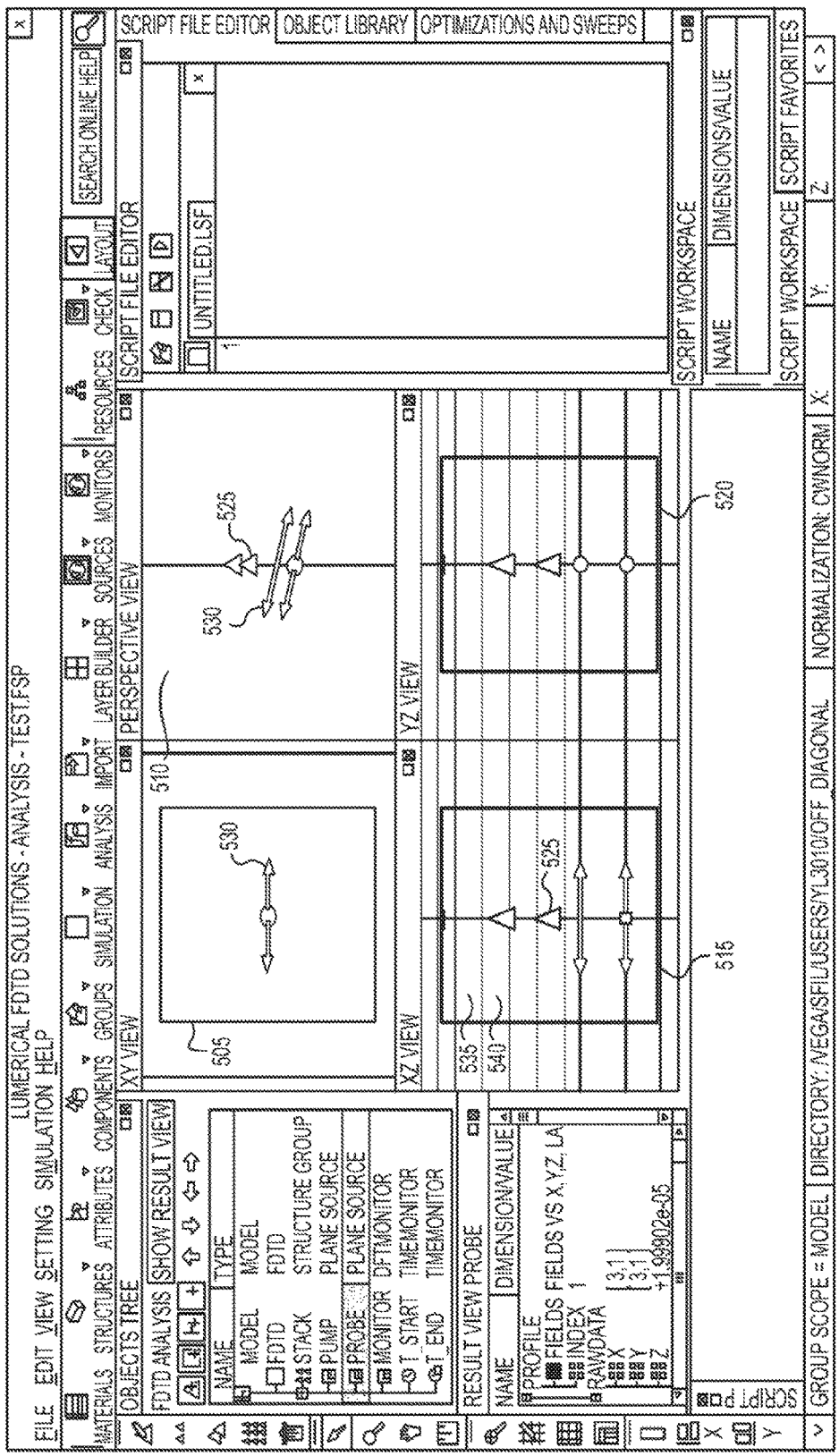
FIG. 5 is an exemplary image illustrating results achieved with the exemplary system according to an exemplary embodiment of the present disclosure.

FIG. 5 shows an exemplary image illustrating validation of the phase maintaining property of the exemplary nonlinear up-conversion via FDTD simulation (e.g., using Lumerical). For example, FIG. 5 illustrates front view 505, perspective view 510, top view 515 and side view 520 of the exemplary device/apparatus. Additionally, arrows 525 show the propagation direction of the exemplary pump beam, while arrows 530 illustrate the polarization of the exemplary probe beam. Alternating rectangles 535 and 540 represent the nonlinear materials having different poling directions, which can be used to match the phase of the pump and probe of the exemplary device/apparatus. For simplicity, two narrowband inputs can be used at different frequencies. The frequency of the pump beam can be set at about 1.9 um, while the frequency of probe beam can be about 1.3 um.

Therefore, an output at about 771.875 nm can be of interest, which can correspond to the cross-product of the beam. During the exemplary simulation, the probe source can be placed at different axial locations to mimic the behavior of a multi-layer reflector.

Figure 6:
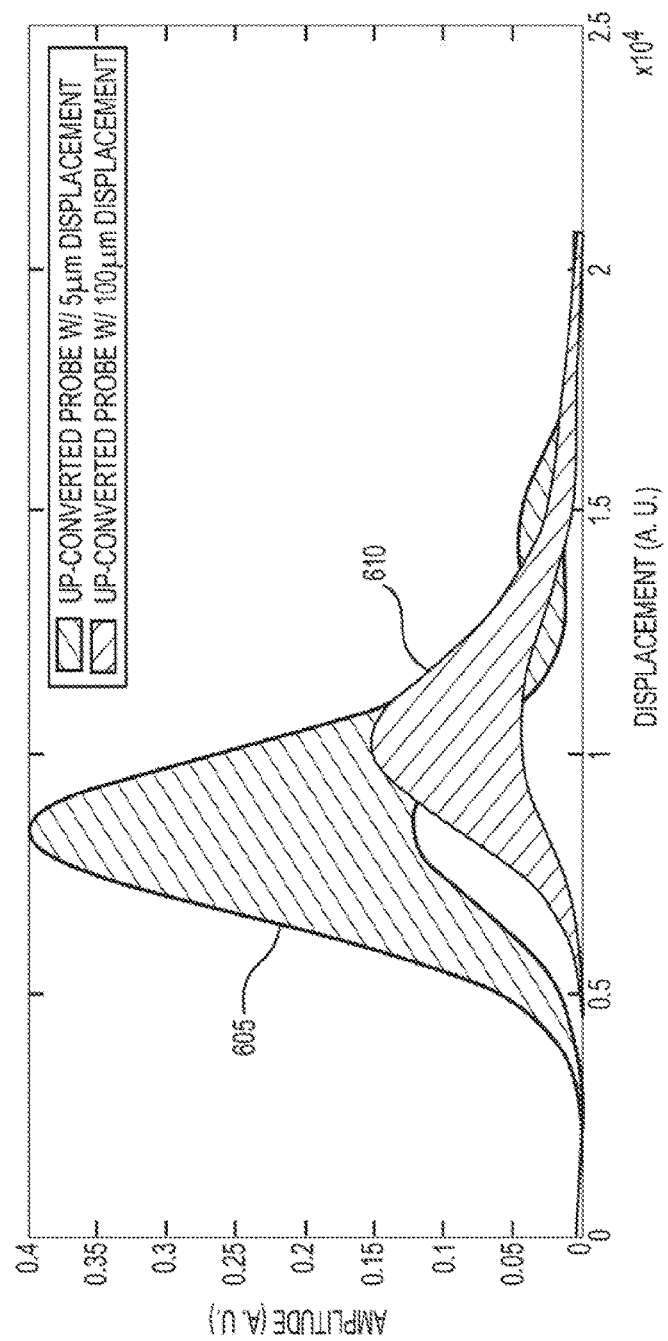
FIG. 6 is a graph illustrating the phase shift of the up-converted probe signal according to an exemplary embodiment of the present disclosure.

FIG. 6 shows an exemplary graph illustrating the phase shift of the up-converted probe with different displacement. A benefit of the exemplary system/apparatus, according to an exemplary embodiment of the present disclosure, can be that the up-converted probe beam can maintain all the phase information, and if the phase information of the original probe beam can be conserved, the depth information of the sample can be extracted. To verify this, the phase of the probe beams can be modulated to mimic a situation where there are signals from the sample at different depths. Curve 605 illustrates the up-converted probe signal originated from a discrete reflector at about 5 um away from the reference within the sample, while the curve 610 illustrates the up-converted probe signal originated from a discrete reflector at about 100 um away from the reference. The peak of the up-converted beam from deeper layer can be to the right of that from the shallower layer.

Figure 7:
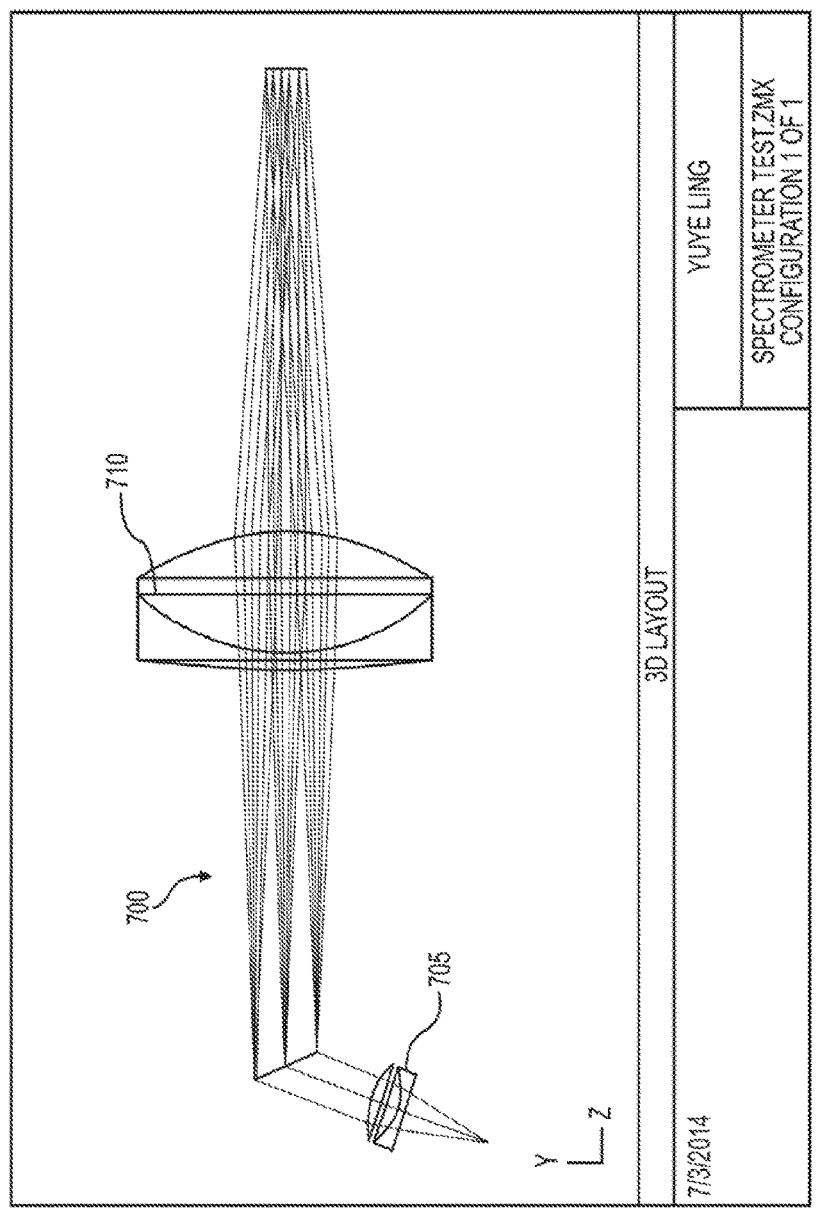
FIG. 7 is a diagram of an exemplary spectrometer according to an exemplary embodiment of the present disclosure.

FIG. 7 shows an exemplary side view diagram of an exemplary spectrometer 700, which illustrates an exemplary optical design for the spectrometer with a wavelength demultiplexer. For example, the beam can be first collimated by a collimator 705 before being dispersed by a diffraction grating 710. The diffraction grating 710 can be arranged in a symmetric configuration to ensure the maximum dispersion. An achromatic doublet can be placed behind the grating to ensure that the grating can be located right on the focal plane of the doublet. A telecentric configuration can be implemented. Thus, the lateral displacement for distinct spectral components can almost be linear with the wavelength. This linearity can be beneficial for the exemplary system due to the stringent restrictions placed on the quasi-phase-matching conditions. A tolerance of about 0.5 nm can be assumed, which means the error in lateral displacement may not exceed about 5 um for a PPLN with about 1 mm in width and about 100 nm in bandwidth.

Exemplary Grating Equation.

The $\theta_i$ incident angle can be defined as the angle between the incident light and the grating, while $\theta_d$ can provide the diffraction angle defined as the angle between the diffracted light and the grating. $\lambda$ can be the wavelength of the light, and F can be the period of the grating. Thus, for example:

$$\theta_d = \theta_i = \sin^{-1}\left(\frac{\lambda F}{2}\right) \quad (5)$$

The walk-off angle $\Delta\theta_d$ between spectral component at wavelength $\lambda$ and that at wavelength $\lambda_0$. $\theta'_d$ can provide the diffraction angle of spectral component at wavelength $\lambda$. Thus, for example:

$$\Delta\theta_d = \theta'_d - \theta_{d_0} = \quad (6)$$
$$\sin^{-1}(\lambda F - \sin\theta_i) - \sin^{-1}\left(\frac{\lambda_0 F}{2}\right) = \sin^{-1}\left(\lambda F - \frac{\lambda_0 F}{2}\right) - \sin^{-1}\left(\frac{\lambda_0 F}{2}\right)$$

Eq. 6 for the lateral displacement Y for a given dispersion angle is provided in Eq. 7. f can be the focal length of the collimation lens. Thus, for example:

$$Y = f \tan \Delta\theta_d \quad (7)$$

Figure 8:
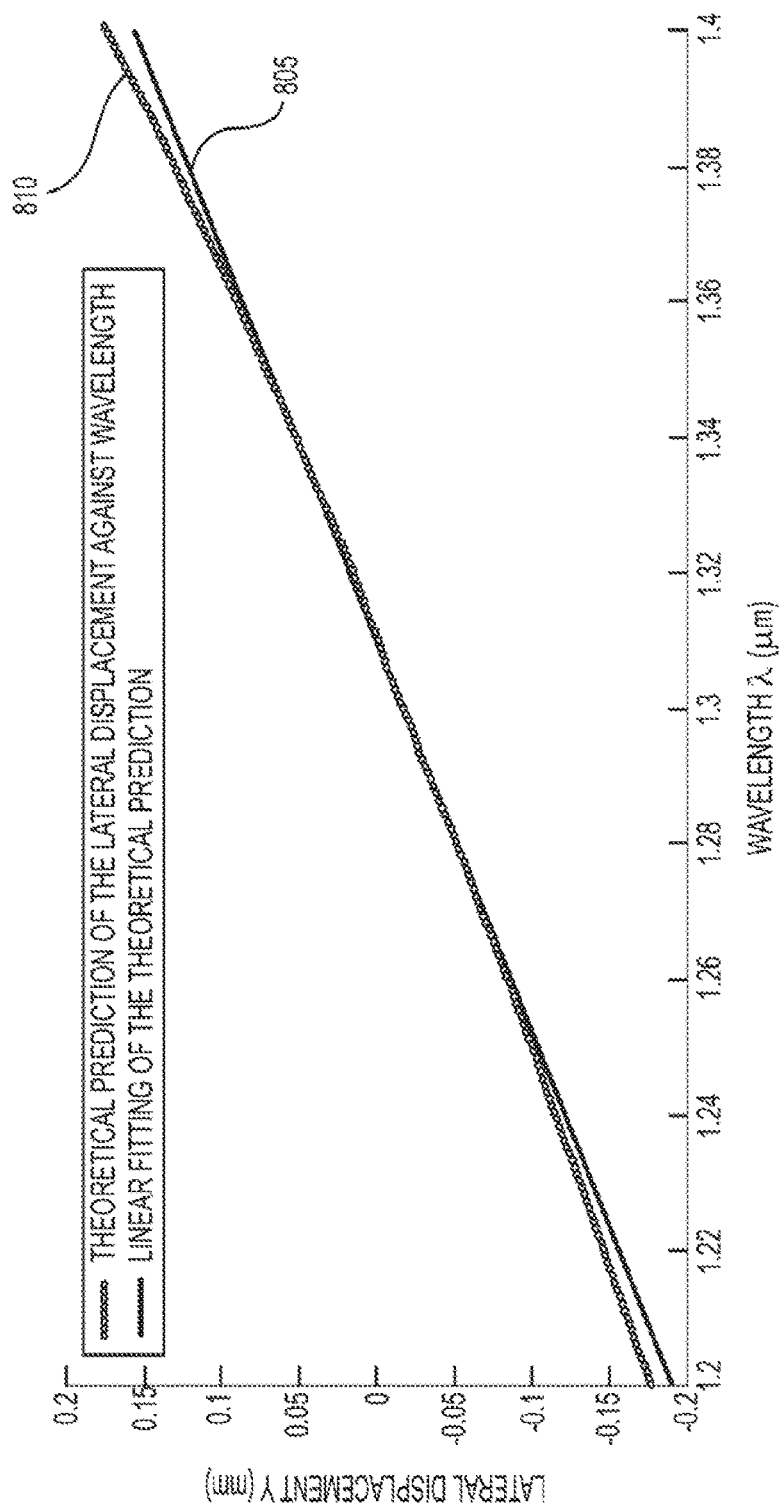
FIG. 8 is a graph illustrating a lateral displacement compared to a wavelength according to an exemplary embodiment of the present disclosure.

FIG. 8 shows an exemplary graph illustrating the lateral displacement compared to the wavelength (e.g., line 810) based on Eq. 7. As illustrated in FIG. 8, line 805 illustrates the linear fit of the data for a bandwidth of about 200 nm centered at about 1300 nm. Unlike a conventional PPLN that has fixed grating period over the entire input surface, the exemplary fan-out grating PPLN can implement a linearly changed grating period over the lateral position. Since the phase-matching condition for the second-harmonic generation can also be linear over the wavelength, optics can be used to direct each spectral components to their corresponding lateral position. Thus, the lateral displacement of the spectral components can be linear over various wavelengths. However, it can be hard to achieve due to the aberration of the lens. Therefore, mismatches can exist.

Figure 9A:
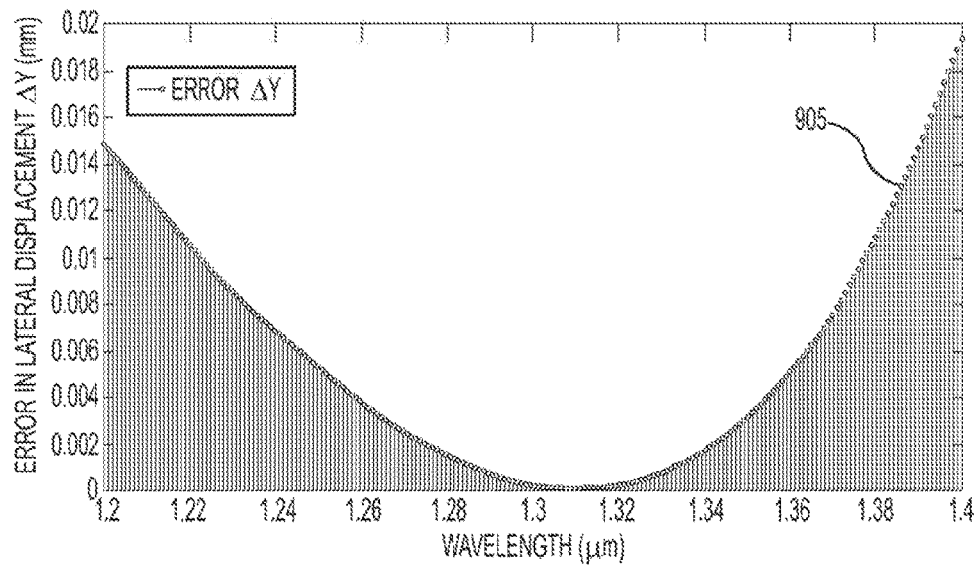
FIGS. 9A-9C are graphs illustrating the error between a fitted curve and data for exemplary bandwidths according to an exemplary embodiment of the present disclosure.

FIG. 9A shows an exemplary graph illustrating the error 905 between the fitted curve and the data for a bandwidth of about 200 nm (e.g., Centered at about 1.3 um). The difference between the theoretical prediction of the lateral prediction and its fitted data can be defined as error $\Delta Y$. As can be seen in FIG. 9A, the maximum mismatch can occur at the tail of the passband, which can be around 20 um.

Figure 9B:
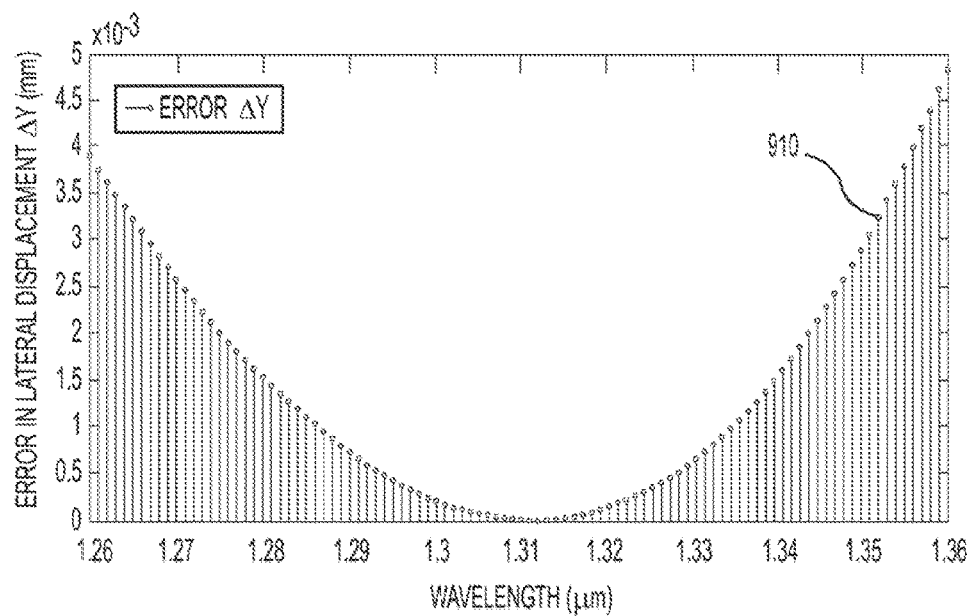

FIG. 9B shows an exemplary graph illustrating the error 910 between the fitted curve and the data for a bandwidth of about 100 nm. With a smaller bandwidth, the maximum mismatch can be reduced to about 5 um.

Figure 9C:
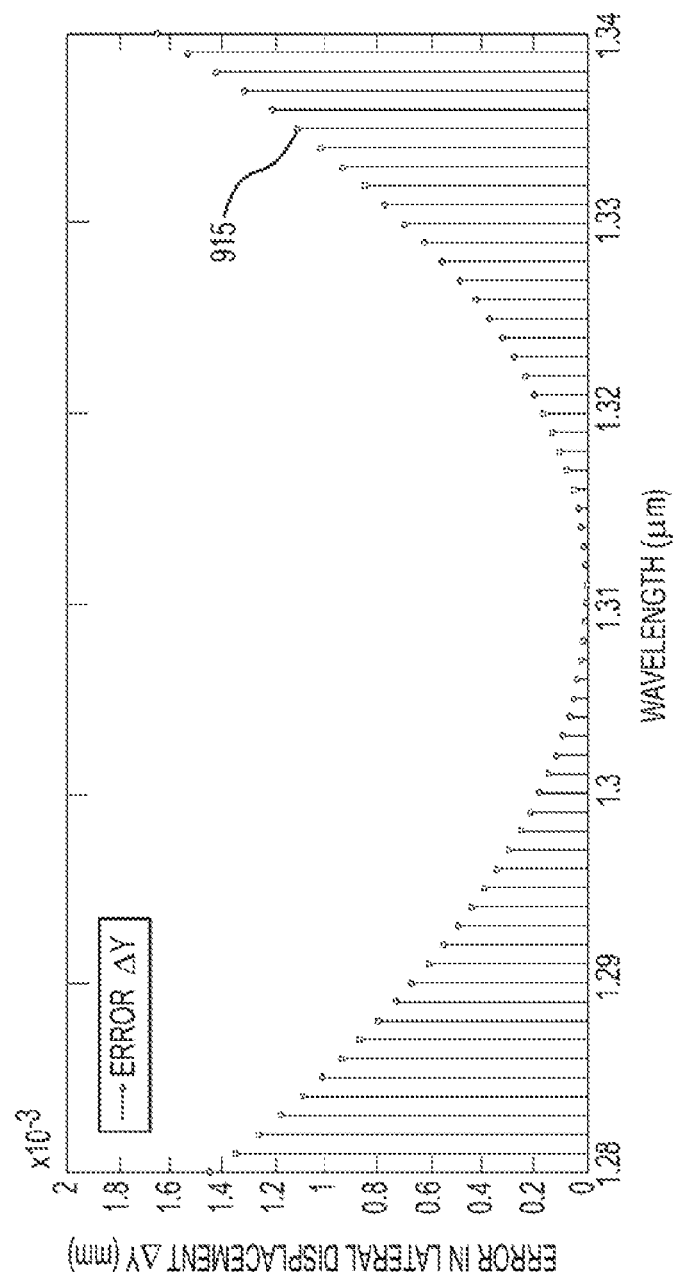

FIG. 9C shows an exemplary graph illustrating the error 915 between the fitted curve and the data for a bandwidth of about 60 nm. With a bandwidth of about 60 nm, the maximum mismatch can be less than about 2 um, which can ensure good conversion efficiency.

Figure 10A:
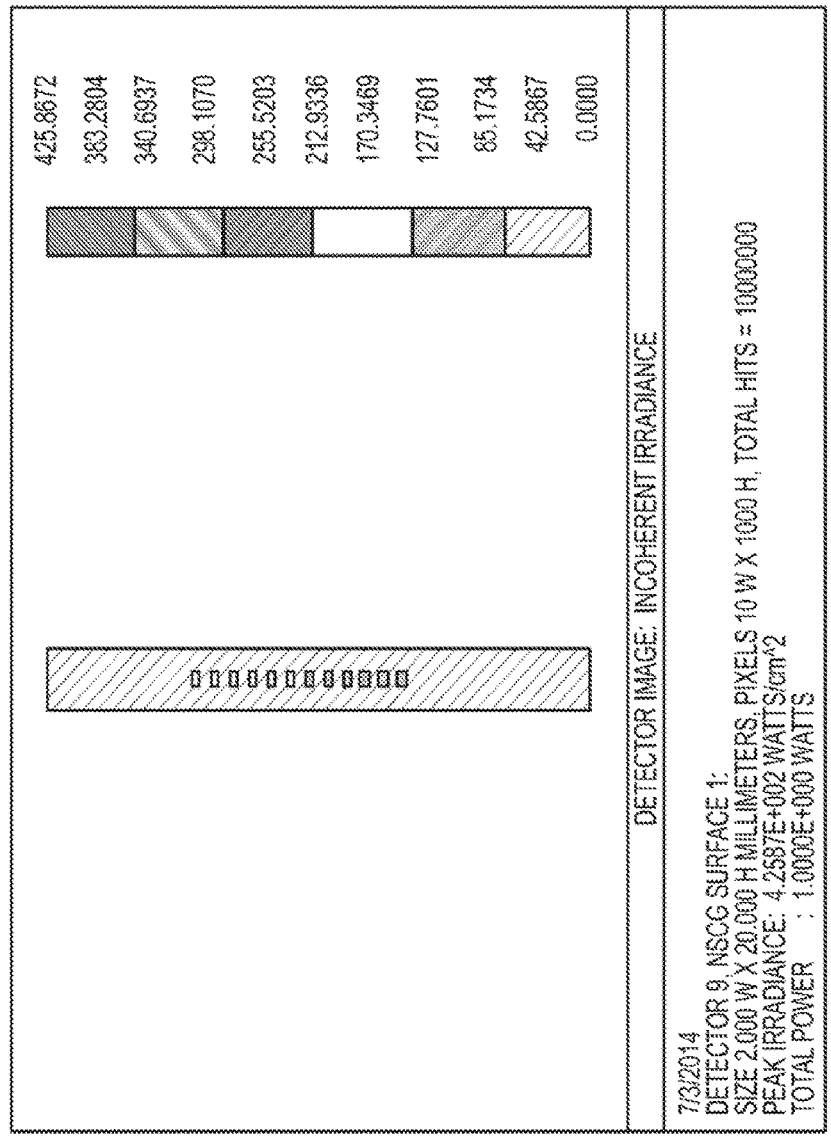
FIGS. 10A and 10B are graphs illustrating non-sequential ray tracing for the exemplary spectrometer according to an exemplary embodiment of the present disclosure.
Figure 10B:
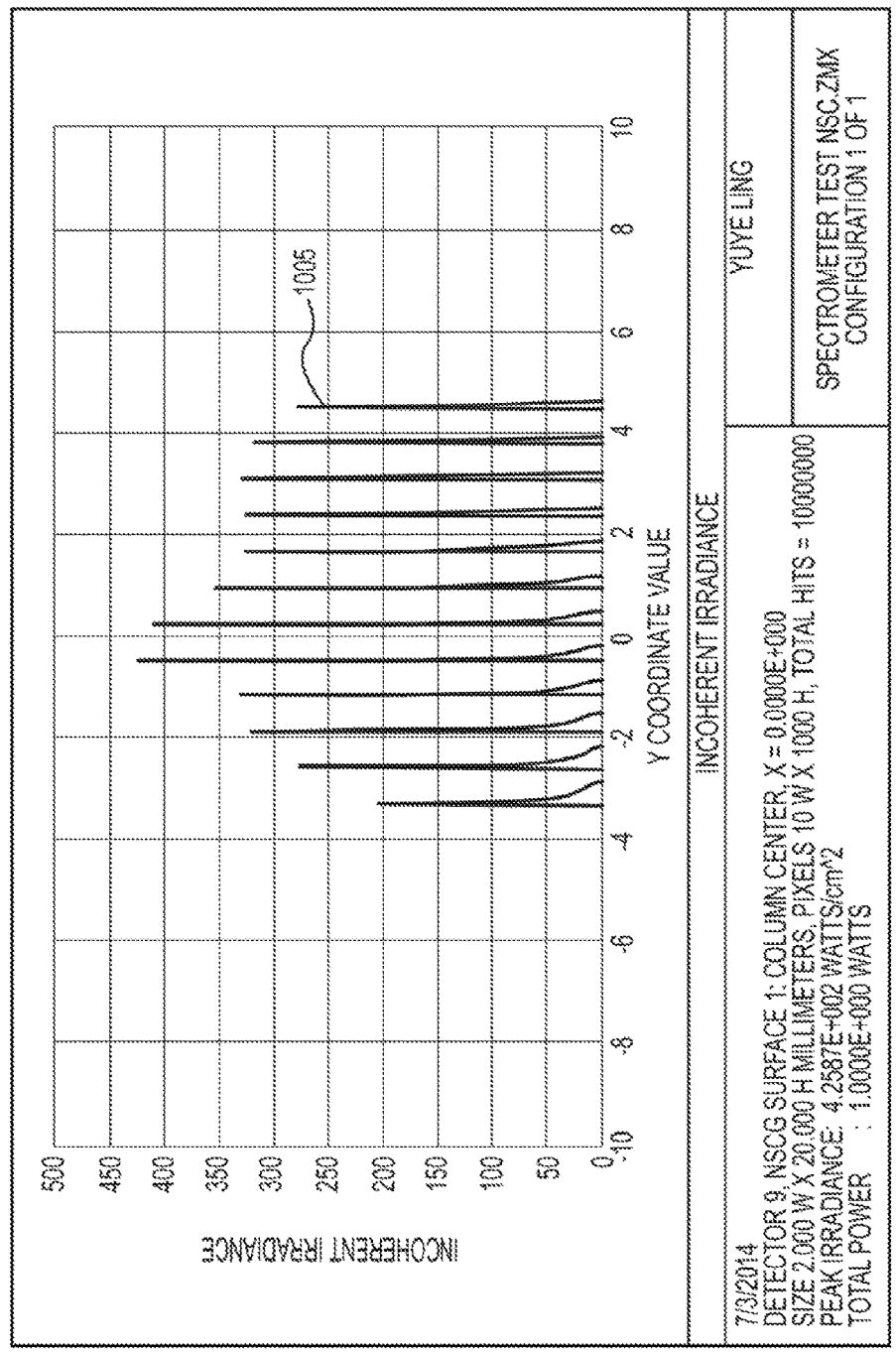

FIGS. 10A and 10B show exemplary graphs illustrating non-sequential ray tracing simulation 1005 for the spectrometer (e.g., using Zemax). Except for the theoretical results based on the lens and the grating equation, a ray tracing simulation based on real-world apparatus can also be performed to prove the feasibility of the exemplary system/apparatus. For example, a broadband input of about 100 nm can be fed to the exemplary system, which can be sampled evenly in wavelength space at about 12 points. As shown in FIGS. 10A and 10B, after going through the grating-lens pair, each spectral components can be dispersed in the y direction if the coordinates of the peaks of those spectral components are further examined. The detected positions can distribute evenly in the spatial domain results. Therefore, the linear relationship between the lateral position and the wavelength can be satisfied, and each spectral component can be properly up-converted.

The electric field of the up-converted pump beam can serve as a reference beam in the optical heterodyne detection to retrieve the phase information embedded in the up-converted probe beam. Thus, for example:

$$\vec{E}_{up-converted\,pump}(k, z) \propto \overleftrightarrow{\chi}^{(2)} \vec{E}_{pump} \cdot \vec{E}_{pump} = \quad (8)$$
$$\frac{\hat{y}}{4} \overleftrightarrow{\chi}^{(2)}_{jjj} r_R^2 E_0^2(k) \exp[i(4kz - 2\omega t)]$$

The measured photocurrent can be induced by the interference between the up-converted probe field and pump field. $\alpha$ and $\beta$ can provide the coupling coefficients of the beam splitter. The first term can be due to the presence of the reference mirror, the third term can be the auto-correlation term that stems from the multi-layer structure and the second term can be the term of interest that can include all the reflectance information for each layer. The first term can be treated as a DC constant, and can be easily removed through low pass filtering. The third term can usually be negligible for samples that possess low reflectance, such as biological tissues. $\rho_v$ can be the responsivity of the photodetector in visible range. $\alpha$ and $\beta$ can provide the coupling coefficient of the beam splitter 185. Thus, for example:

$$I(k) = \rho_V \left| \alpha \vec{E}_{up-converted\ pump} + \beta \vec{E}_{up-converted\ probe} \right|^2 = \quad (9)$$

$$\rho_V \left\{ \frac{1}{16} \alpha^2 \chi_{jjj}^{(2)} r_R^4 E_0^4(k) + \frac{1}{8} \alpha \beta \chi_{jij}^{(2)} \chi_{jjj}^{(2)} r_R^3 E_0^4(k) \sum_n r_n \cos(k \Delta z_n) + \frac{1}{16} \beta^2 \chi_{jij}^{(2)} r_R^2 E_0^2(k) \sum_m \sum_n r_m r_n \exp[i2k(\Delta z_m - \Delta z_n)] \right\}$$

A Fourier transform against k can be performed similar to a conventional SS-OCT. However, there can be a notable difference (e.g., a factor of 2 appears in front of the $\Delta z_n$ within the cosine term). This can amplify the separation between consecutive discrete reflectors, which can effectively increase the axial resolution by a factor of 2. $\gamma(z)$ can be the axial point spread function of the exemplary SS-OCT system with the same bandwidth. Thus, for example:

$$\mathcal{F}\left[\chi_{jij}^{(2)}\chi_{jjj}^{(2)} r_R^3 E_0^4(k) \sum_n r_n \cos(2k\Delta z_n)\right] = \quad (10)$$

$$\frac{1}{2} \chi_{jij}^{(2)} \chi_{jjj}^{(2)} r_R^3 (\gamma(z) \otimes \gamma(z)) \sum_n r_n [\delta(z - 2\Delta z_n) + \delta(z + 2\Delta z_n)]$$

The FWHM of the point spread function in the exemplary system can be enlarged by a factor of $\sqrt{2}$. However, if the effect described in Eq. 10 can be combined with that of Eq. 11, which can be an effective improvement on axial resolution by a factor of $\sqrt{2}$ can be achieved.

$$\gamma'(z) = \gamma(z) \otimes \gamma(z) \quad (11)$$

Figure 11:
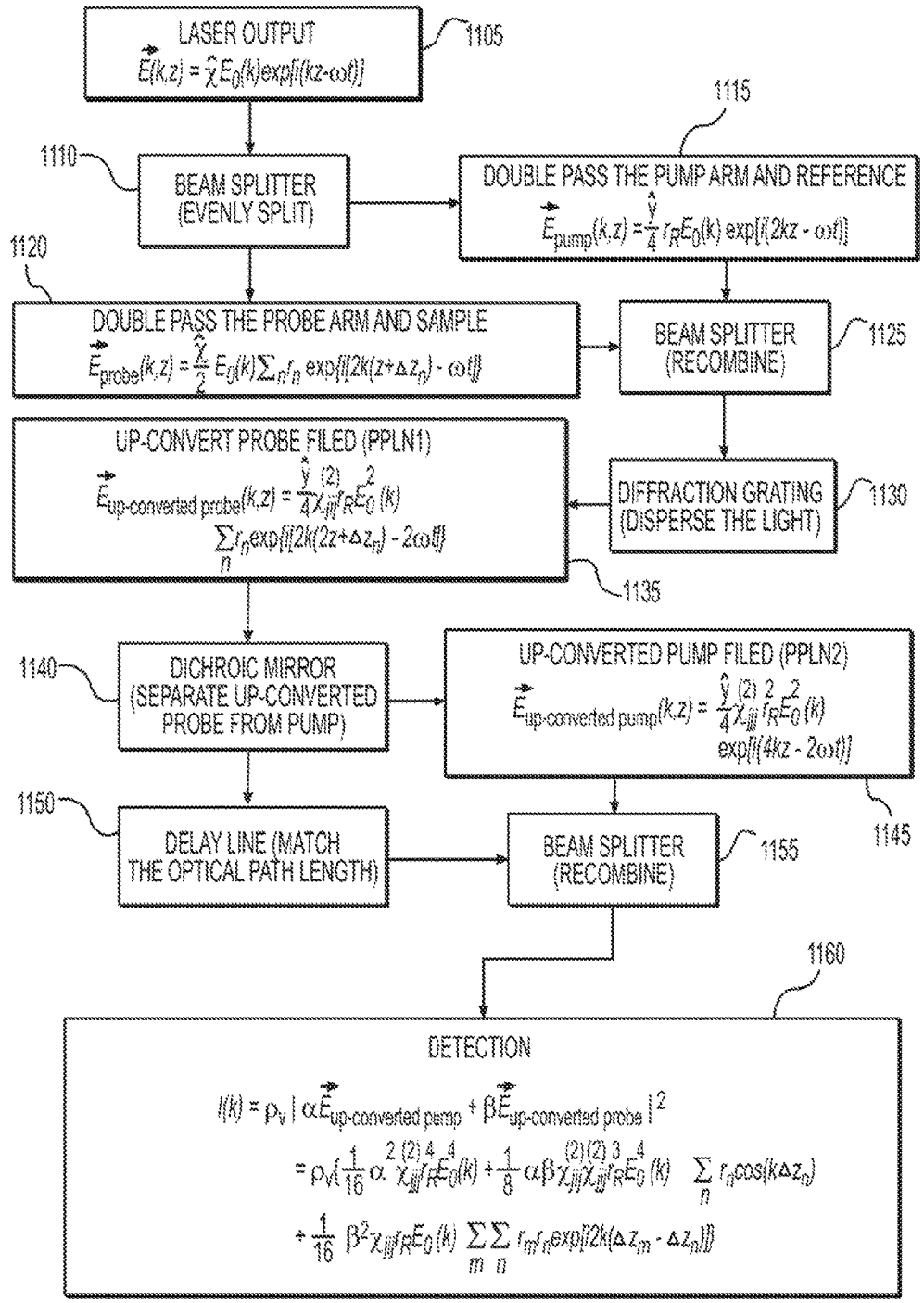
FIG. 11 is a flow diagram illustrating an exemplary method for use of the exemplary system according to an exemplary embodiment of the present disclosure.

FIG. 11 shows an exemplary flow diagram illustrating an exemplary method for use of the exemplary system. At procedure 1105, a linearly polarized beam can be emitted from the laser source. It can then be evenly split by a beam splitter at procedure 1110. Half of the beam can go to the pump arm where it can double pass a quarter wave plate. When it arrives, at the beam splitter again, the polarization state of the beam can be rotated by about 90° at procedure 1115. The rest of the beam can proceed to the probe arm where it can be back scattered by the sample at procedure 1120. Both beams can be recombined at the beam splitter at procedure 1125, and can be fed to a diffraction grating, where the beams can be angularly dispersed at procedure 1130. By carefully design the collimation optics, each spectral components can be directed to their corresponding lateral position on the fan-out grating PPLN, where the spectral components of the probe can be up-converted at procedure 1135. A dichroic mirror can separate the up-converted probe beam from the undepleted pump beam at procedure 1140. The undepleted pump beam can then be up-converted by the fan-out grating PPLN in the same fashion as that of procedures 1135 and 1145. The up-converted probe beam can go through a delay line at procedure 1150 to match the optical path length of the up-converted pump. Both the up-converted pump and the up-converted probe can recombine at a beam splitter at procedure 1155, and an optical heterodyne detection can be performed at a linear detector at procedure 1160.

Figure 12A:
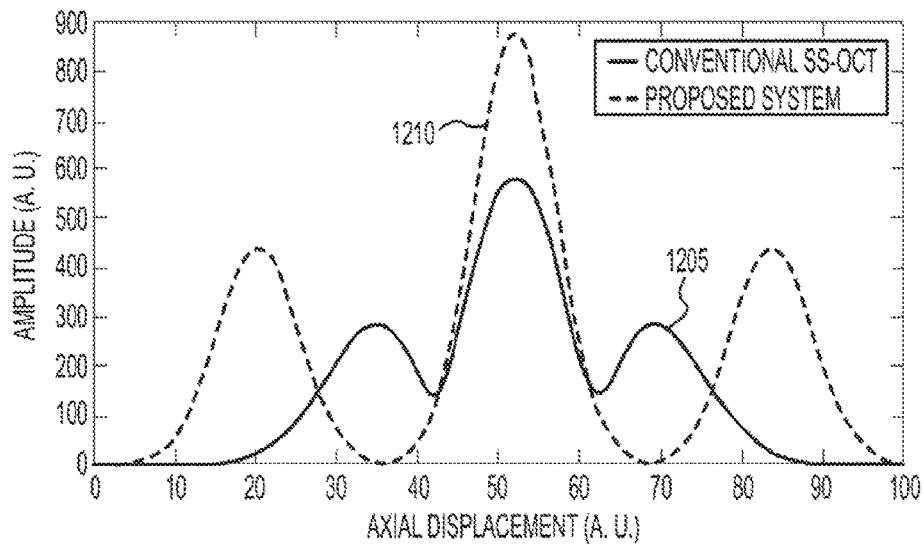
FIGS. 12A-12C are graphs illustrating the comparison of axial discrimination capabilities between a conventional SS-OCT system and the exemplary SS-OCT system.
Figure 12B:
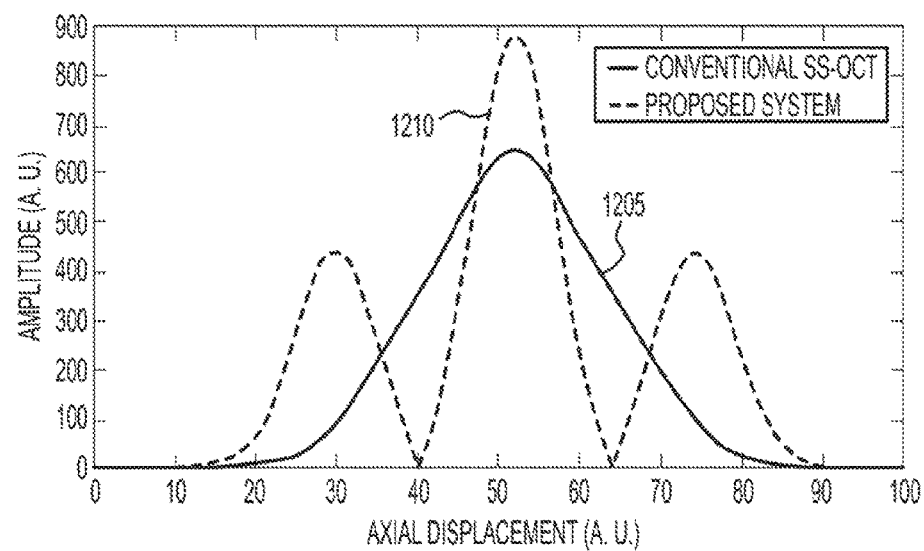
Figure 12C:
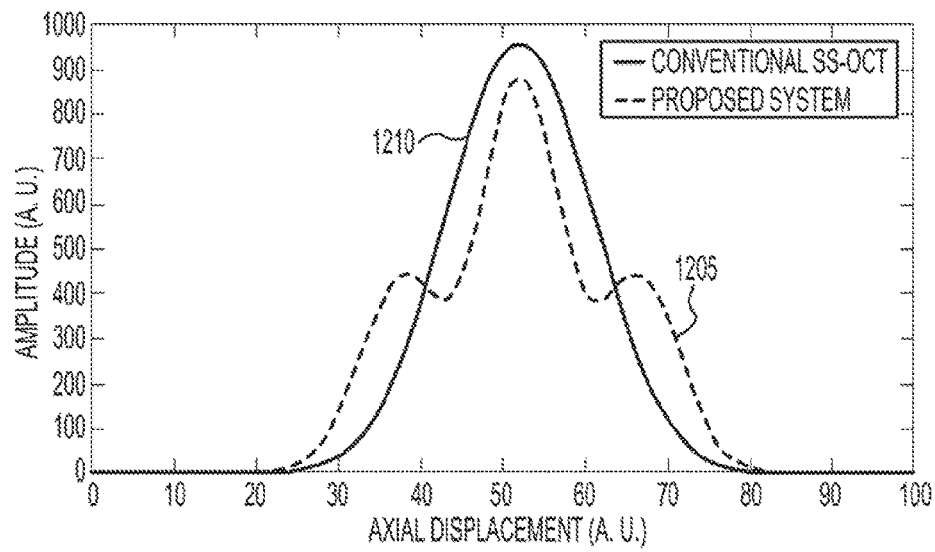

FIGS. 12A-12C show exemplary graphs illustrating the comparison of axial discrimination capabilities between a conventional SS-OCT system and the exemplary system/apparatus with the same source laser bandwidth of about 60 nm. The plot can be based on a numerical simulation by using MATLAB. Line 1205 represents the resolved image from conventional SS-OCT, while line 1210 represents that from the exemplary system. Two consecutive discrete reflectors can be placed about 20 um apart. In this exemplary case, both systems can resolve the separation when two consecutive discrete reflectors can be placed about 15 um apart the conventional SS-OCT starts to fail when two consecutive discrete reflectors can be placed 20 um apart both systems cannot resolve the separation.

For example, $\sigma^2$ can be the average shot noise intensity. S(k) can be the spectral density of the electric field $E_0$. The term $r_R \chi_{jij}^{(2)} \sqrt{S(k)}$ can represent the conversion efficiency of the nonlinear optical process in optical conversion stage, while $r_R \chi_{jjj}^{(2)} \sqrt{S(k)}$ can provide that in a nonlinear detection stage. When the second-harmonic generation can be applied, the maximum conversion efficiency that can obtained can be 1 due to the fact that the number of generated SH photons may never exceed that of the signal photons at fundamental frequency. However, it can be possible to achieve conversion efficiency much higher than 1 by applying a nonlinear optical process such as optical parametric amplification. Thus, a SNR much higher than SS-OCT can be obtained. Therefore, for example:

$$SNR = \frac{I^2}{\sigma^2} = \frac{1}{16} \frac{\rho_V r_S^2 \left(r_R \chi_{jij}^{(2)} \sqrt{S(k)}\right) \cdot \left(r_R \chi_{jjj}^{(2)} \sqrt{S(k)}\right) \cdot S(k)}{eB} \quad (12)$$

Eqs. 13 and 14 describe the phase-matching condition for second-harmonic generation. $\omega_1$ and $\omega_2$ can give the angular frequency of the input fundamental wave and output second-harmonic. $n_i$, $n_j$, and $n_k$ can stand for the refractive index of the anisotropic material with different input polarizations. i, j, k can be any value of x, y, z. The refractive index can be wavelength dependent. Thus, for example:

$$1310:\ n_i(\omega_1)\cdot\omega_1 + n_j(\omega_1)\cdot\omega_1 = n_k(\omega_2)\cdot\omega_2 \quad (13)$$

$$1320:\ \omega_1 + \omega_1 = \omega_2 \quad (14)$$

Figure 13:
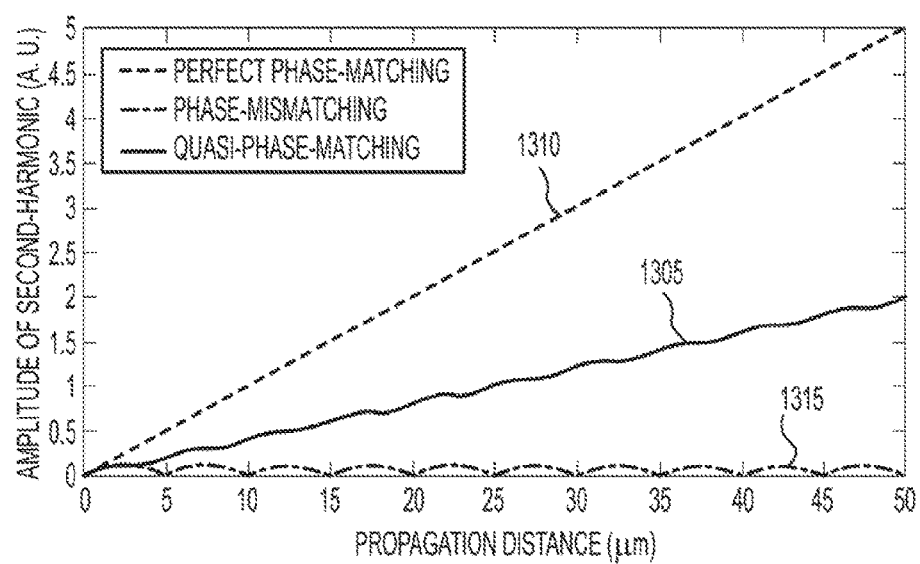
FIG. 13 is a graph illustrating the comparison of the field amplitude of second harmonic components for quasi-phase-matching according to an exemplary embodiment of the present disclosure.

FIG. 13 shows an exemplary graph illustrating the comparison of a field amplitude of second-harmonic components for quasi-phase-matching (e.g., element 1305), perfect phase-matching (e.g., element 1310) and phase mismatching (e.g., element 1315). For performing phase-matching in bulky birefringent nonlinear crystal, Eq. 13 has to hold. However, due to the dispersion property of real material, the phase-matching can be nontrivial. In most cases, for a specific fundamental wavelength, only a certain configuration of both the polarization and the incident angle can satisfy the phase-matching condition. If the phase can be mismatched, the energy can be converted between the fundamental field and second-harmonic field back and forth.

It can be possible to circumvent the restrictions on second-harmonic generation. The polling direction of the crystal when the oscillating field reaches its peak can be changed. Therefore, instead of transferring energy from the second-harmonic to the fundamental field, the process can be reversed, and the amplitude of the second-harmonic can keep growing and propagating.

Figure 14:
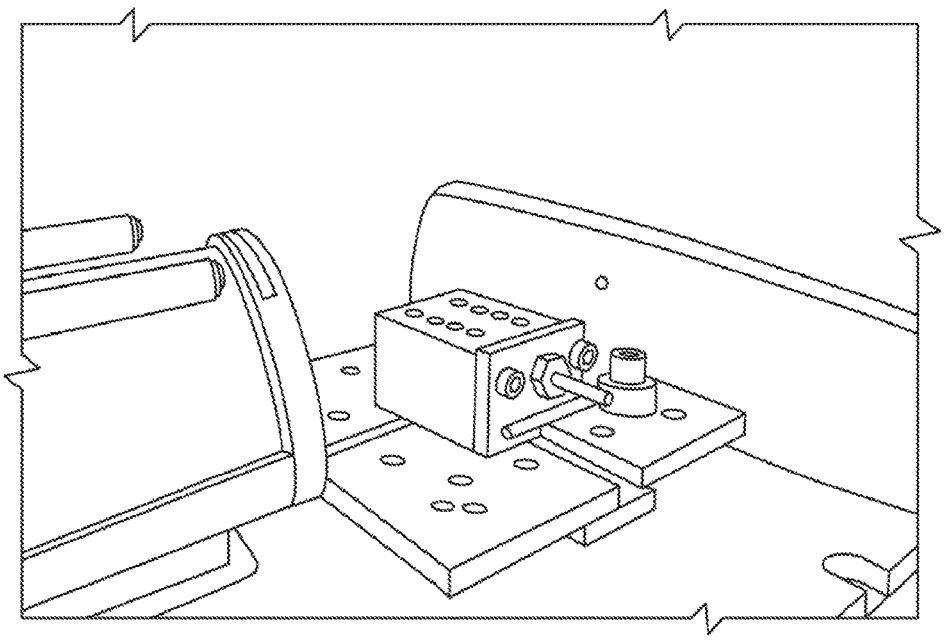
FIG. 14 is an image of a second-harmonic generating apparatus according to an exemplary embodiment of the present disclosure.

FIG. 14 shows an exemplary image of the second-harmonic generation by using periodically-poled lithium niobate. A Fabry-Perot laser centered at about 1300 nm with a FWHM of about 5 nm can be applied, and a pair of achromatic lenses can be used to focus the beam spot down to about 50 um. The infrared input can be frequency doubled while travelling through the fan-out grating PPLN, and the red output from the other side of the crystal can be observed.

Figure 15:
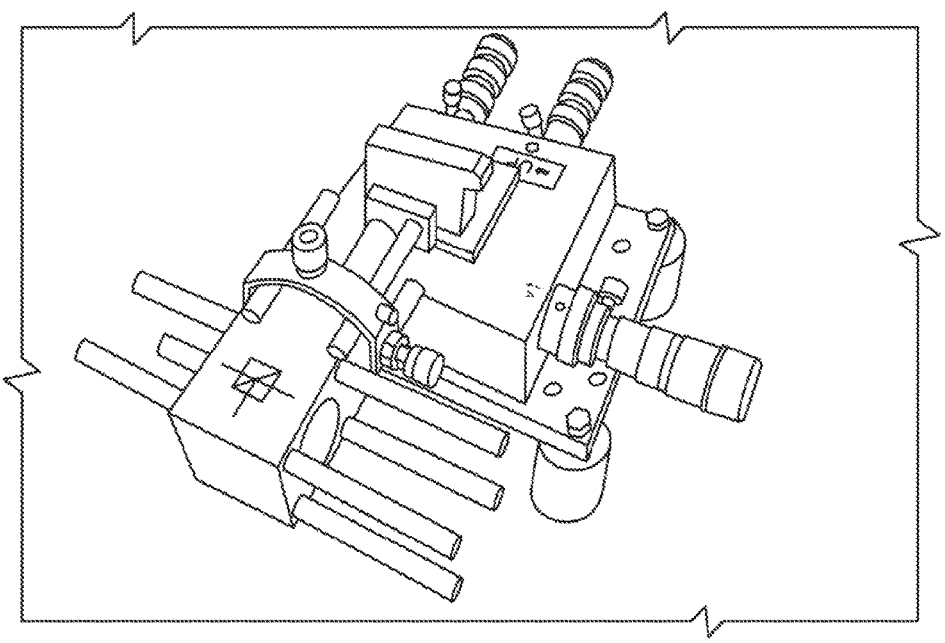
FIG. 15 is an image of a further second-harmonic generating apparatus according to an exemplary embodiment of the present disclosure.

FIG. 15 shows an exemplary image of the second-harmonic generation by using periodically-poled lithium niobate in a Michaelson interferometer configuration (e.g., the same laser as that in FIG. 14 can be used). However, in this exemplary case, the beam can be split into two beams before being incident onto the crystal. When both beams can be unblocked, the detected power at second-harmonic frequency can be about 0.11 uW. However, if either arm is blocked, the power can drop to about 0.3 uW. This can show that two beams can interact with each other within the crystal. If the two beams only interact with themselves in the crystal, the output when both beams are present can be twice that of either beam. But in the exemplary case, the output when two beams are presented can be almost four times that of one beam, which can indicate that it can be the arithmetic sum of the two beams plus the interference terms as well.

Figure 16:
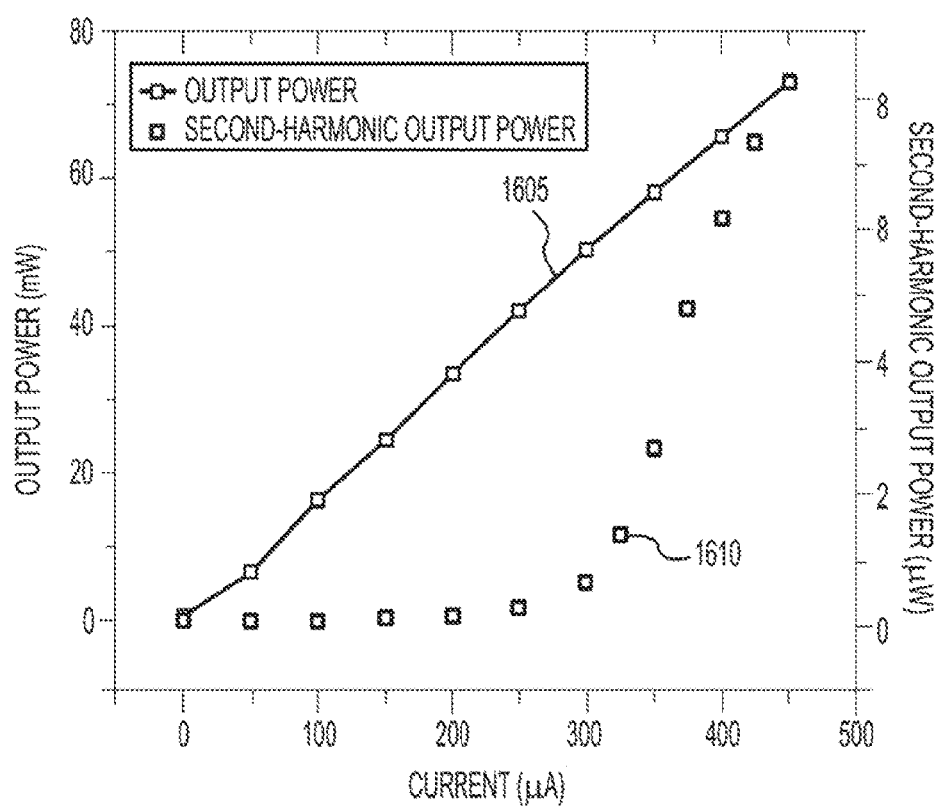
FIG. 16 is a graph illustrating experimental data of a second-harmonic generating apparatus according to an exemplary embodiment of the present disclosure.

FIG. 16 shows an exemplary graph illustrating the experiment data of the second-harmonic generation. In this exemplary experiment, a Fabry-Perot laser centered at about 1310 nm with a FWHM of about 5 nm can be used. The fan-out grating PPLN has a length of about 5 mm. The x axis gives the current level of the laser, the lefty axis shows the output power from the laser and the right y axis gives the power level of the generated second-harmonic field. In the exemplary experiment, the output power (e.g., line 1605) of the input laser can be controlled by tuning the current applied. This relationship can almost be linear. Dots 1610 illustrate the second-harmonic output power obtained by a certain input power level. As can be seen in FIG. 16, the second-harmonic output power 1610 can be nonlinear with the input, and a threshold effect can be observed. The second harmonic generation may not build up for an input power lower than about 50 mW. This can be expected since the second-harmonic power can be proportional to the square of the input power. A maximum conversion efficiency of about 0.31%/(W·cm) can be achieved, while the theoretical value can be about 1%/(W·cm). A higher conversion efficiency can be obtained with narrower FWHM, higher input power and a longer crystal.

Exemplary Dispersion-Cancellation SS-OCT

Figure 17:
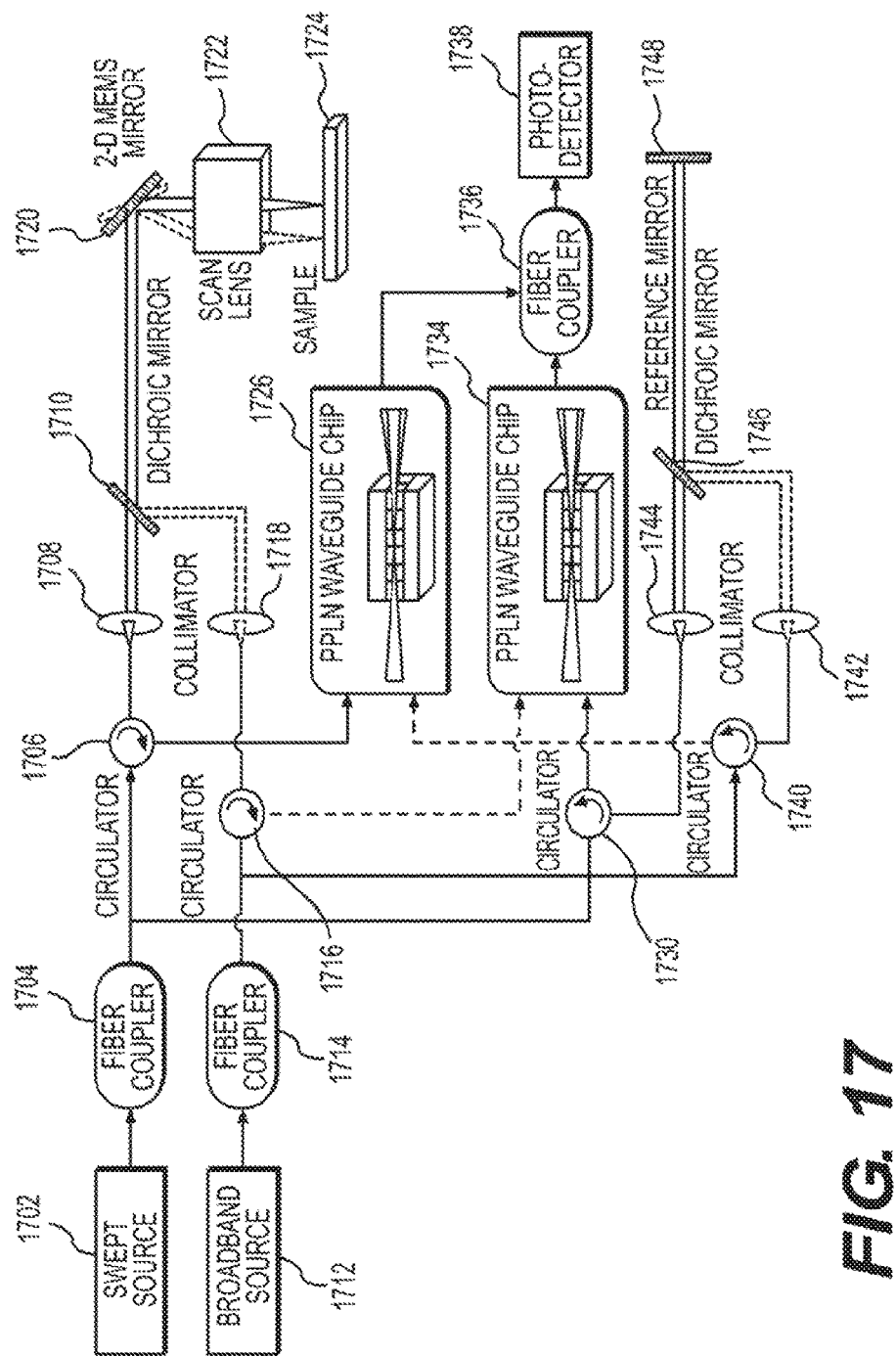
FIG. 17 is an exemplary diagram of dispersion-cancellation SS-OCT according to an exemplary embodiment of the present disclosure.

The exemplary automatic broadband second-harmonic generation procedure based on a fan-out grating periodically poled lithium niobate can be used, which can show that the bandwidth of the conversion can be about 40 nm. In addition to the axial resolution improvement described above, it can be possible to obtain the dispersion cancellation through a similar exemplary system/procedure with a higher-efficiency waveguide PPLN. An exemplary diagram of the exemplary dispersion-cancellation SS-OCT system is illustrated in FIG. 17. The optical arrangement of the exemplary system can be similar to that of the fiber-based wavelength division multiplexing ("WDM") OCT system. For example, as shown in a diagram of FIG. 17 which illustrates the exemplary system according to an exemplary embodiment of the present disclosure, a swept-source 1702 of such exemplary system can generate radiation that is provided to a fiber coupler 1704, circulated at circulator 1708, and then collimated using collimator 1708. The collimated light from collimator 1708 can be transmitted through dichroic mirror 1710, reflected off of a two-dimensional micro mirror 1720 into a scan lens 1722, which can provide the laser radiation to a sample 1724. A broadband source 1712 can also generate a radiation that is provided to a coupler 1714, circulated at circulator 1716, and collimated using collimator 1718. This radiation is also reflected off of dichroic mirror 1710, and then provided to sample 1724 (e.g., including but not limited to biological tissue) in a similar manner to the radiation generated from swept-source 1702.

As further illustrated in the diagram of FIG. 17, the radiation from swept-source 1702, which is circulated through circulator 1706, can also be provided to a PPLN waveguide chip 1726 and then to a further fiber coupler 1736, which provides the radiation to photodetector 1738. In a similar manner, the radiation from broadband source 1712, which is provided through circulator 1716, can be provided to a further PPLN waveguide chip 1734, and then on to fiber coupler 1736, which provides the radiation to photodetector 1738. The radiation provided from fiber coupler 1704 can be provided to a further circulator 1730, which provides the radiation to both the PPLN waveguide chip 1734, and to a collimator 1746, which provides this radiation to a reference mirror 1748 through dichroic mirror 1746. In addition, the radiation provided from fiber coupler 1714 can be provided to circulator 1740, which provides the radiation to a collimator 1742. This radiation can then be reflected off of dichroic mirror 1746 to reference mirror 1748.

As described above in reference to FIG. 17, the exemplary system can include two dichroic mirrors, which can be used to multiplex the wavelength-sweeping source and the broadband source. The multiplexed beams can then be directed to the sample object and the reference mirror. The backscattered sample beams and reflected reference beams can be redirected via two optical circulators. Then, the sample beam from the swept source can be mixed with the reference beam from the broadband source in the PPLN waveguide chip and vice versa. At any given instance, both processes can lead to outputs at same frequency, which can be detected through optical heterodyne.

At the front surface of the PPLN waveguide chips, the light fields via both arms from each light sources can be provided as, for example:

$$E_{1,R}(\omega_1(t)) = E_{1,0}(\omega_1(t)) \cdot \exp(ik_1(t)z_0) \quad (15)$$

$$E_{1,S}(\omega_1(t)) = E_{1,0}(\omega_1(t)) \cdot \sum_n r_n(\omega_1(t)) \exp[ik_1(t)(z_0 + \Delta z_n)] \quad (16)$$

$$E_{2,R}(\omega_2) = E_{2,0}(\omega_2) \cdot \exp(ik_2 z_0) \quad (17)$$

$$E_{2,R}(\omega_2) = E_{2,0}(\omega_2) \cdot \sum_n r_n(\omega_2) \exp[ik_2(z_0 + \Delta z_n)] \quad (18)$$

where it can be assumed that the sample object can be properly modeled by a set of multiple discrete reflectors. Then, the reference beam from one light source can be paired with the sample beam from the other light source, and they can be fed to a waveguide PPLN chip, which can be designed to quasi-phase-match the following exemplary sum-frequency generation, which can be, for example:

$$2\omega_{00} = \omega_{10} + \omega_{20} \quad (19)$$

where $\omega_{00}$ can be a chosen wavelength and $\omega_{10}$, $\omega_{20}$ can be the central wavelength of the wavelength-sweeping source and broadband laser, respectively. The up-converted signal can be written as, for example:

$$E_{sum,1} = \chi^{(2)}(\omega_0(t) = \omega_1(t) + \omega_2(t)) \cdot E_{1,S}(\omega_1(t))E_{2,R}(\omega_2(t)) \quad (20)$$

$$= \chi^{(2)}(\omega_0(t) = \omega_1(t) + \omega_2(t)) \cdot E_{1,0}(\omega_1) \cdot$$

$$\sum_n r_n(\omega_1(t))\exp[ik_1(t)(z_0 + \Delta z_n)] \cdot E_{2,0}(\omega_2(t)) \cdot$$

$$\exp(ik_2(t)z_0)$$

$$= A(\omega_1(t), \omega_2(t)) \cdot$$

$$\sum_n r_n(\omega_1(t))\exp\{i[k_1(t) + k_2(t)]z_0 + k_1(t)\Delta z_n\}$$

$$E_{sum,2} = \chi^{(2)}(\omega_0(t) = \omega_1(t) + \omega_2(t)) \cdot E_{1,R}(\omega_1(t))E_{2,S}(\omega_2(t)) \quad (21)$$

$$= \chi^{(2)}(\omega_0(t) = \omega_1(t) + \omega_2(t)) \cdot E_{1,0}(\omega_1(t)) \cdot$$

$$\exp(ik_1(t)z_0) \cdot E_{2,0}(\omega_2(t)) \cdot$$

$$\sum_n r_n(\omega_2)\exp[ik_2(t)(z_0 + \Delta z_n)]$$

$$= A(\omega_1(t), \omega_2(t)) \cdot$$

$$\sum_n r_n(\omega_2)\exp\{i[(k_1(t) + k_2(t))z_0 + k_2(t)\Delta z_n]\}$$

where $A(\omega_1(t), \omega_2(t)) = \chi^{(2)}(\omega_0(t)=\omega_1(t)+\omega_2(t)) \cdot E_{1,0}(\omega_1(t)) \cdot E_{2,0}(\omega_2(t))$. Since the angular frequency of both up-converted fields can be the same, a simple optical heterodyne detection can be used to retrieve the phase, and the detected current can be provided as for example:

$$i = \alpha(E_{sum,1} + E_{sum,2})(E_{sum,1} + E_{sum,2})^* \quad (22)$$

$$= \alpha|A(\omega_1(t), \omega_2(t))|^2 \cdot t)\sum_n |r_n|^2 +$$

$$\sum_{n \neq l} r_n r_l^*[\exp(ik_1(t)\Delta z_{nl}) + \exp(ik_2(t)\Delta z_{nl})] +$$

$$2\sum_n |r_n|^2\cos[(k_1(t) - k_2)\Delta z_n] +$$

$$2\sum_{n \neq l} r_n r_l^*\cos(k_1(t)\Delta z_n - k_2\Delta z_l))$$

where $r_n$ can be assumed to be invariant with angular frequency, $\alpha$ can be the responsivity, and $\Delta z_{nl} = \Delta z_n - \Delta z_l$. In Eq. 22, the first two terms within the parentheses can refer to the DC and autocorrelation term, respectively. The third term can contain all the depth information in its phase, and the fourth term can be referred to as an artifact. Since the first two terms can be easily filtered out by using a high-pass filter, and they can properly set the offset of the first layer, the third term can be focused on. Then, $k_1(t)$, and $k_2$ can be expanded around $\omega_0(t)$ using Taylor expansion theory. Thus, for example:

$$k_1(t) = k(\omega_0(t) - \omega'(t)) \quad (23)$$

$$= k(\omega_0(t)) - \beta' \cdot \omega'(t) + \frac{1}{2}\beta'' \cdot \omega'(t)^2 + O(\omega'(t)^2))$$

$$k_2 = k(\omega_0(t) + \omega'(t)) \quad (24)$$

$$= k(\omega_0(t)) + \beta' \cdot \omega'(t) + \frac{1}{2}\beta'' \cdot \omega'(t)^2 + O(\omega'(t)^2))$$

By substituting Eqs. 23 and 24 into the third term within the parentheses of Eq. 22, the following can be obtained, where, for example:

$$2\sum_n |r_n|^2\cos[i(k_1 - k_2)\Delta z_n] = 2\sum_n |r_n|^2\cos[-2\beta' \cdot \omega'(t) \cdot -z_n]) \quad (25)$$

This exemplary result can be mathematically similar to that of quantum-inspired OCT; the second-order dispersion can be cancelled and the factor before the first-order dispersion coefficient β' can be doubled. However, the angular frequency ω'(t) in the exemplary system can be time dependent. As a result, an exemplary Fourier-domain detection can be possible, and the reference scanning in time domain may no be longer required. The depth information of the sample can then be retrieved by performing an inverse Fourier transform on Eq. 25. Thus, for example:

$$\mathcal{F}^{-1}\left\{2|A(\omega_1(t), \omega_2(t))|^2\sum_n |r_n|^2\cos[-o\beta' \cdot \omega'(t) \cdot oz_n]\right\} = \quad (26)$$

$$C \cdot [S_1(z) * S_2(z)] \cdot \sum_n |r_n|^2 \cdot C \cdot (z - 2\Delta z_n) + \delta(z + 2\Delta z_n)])$$

where C can be constant, $S_i(z)$ can be the Fourier transform of the spectral power density of the light sources, and δ(z) can be the Dirac delta function. As shown in Eq. 26, the axial resolution can be increased by a factor-of-√2; the axial PSF can be widened by a √2 times, while the separation between adjacent discrete layers can be enlarged by 2 times.

Figure 18:
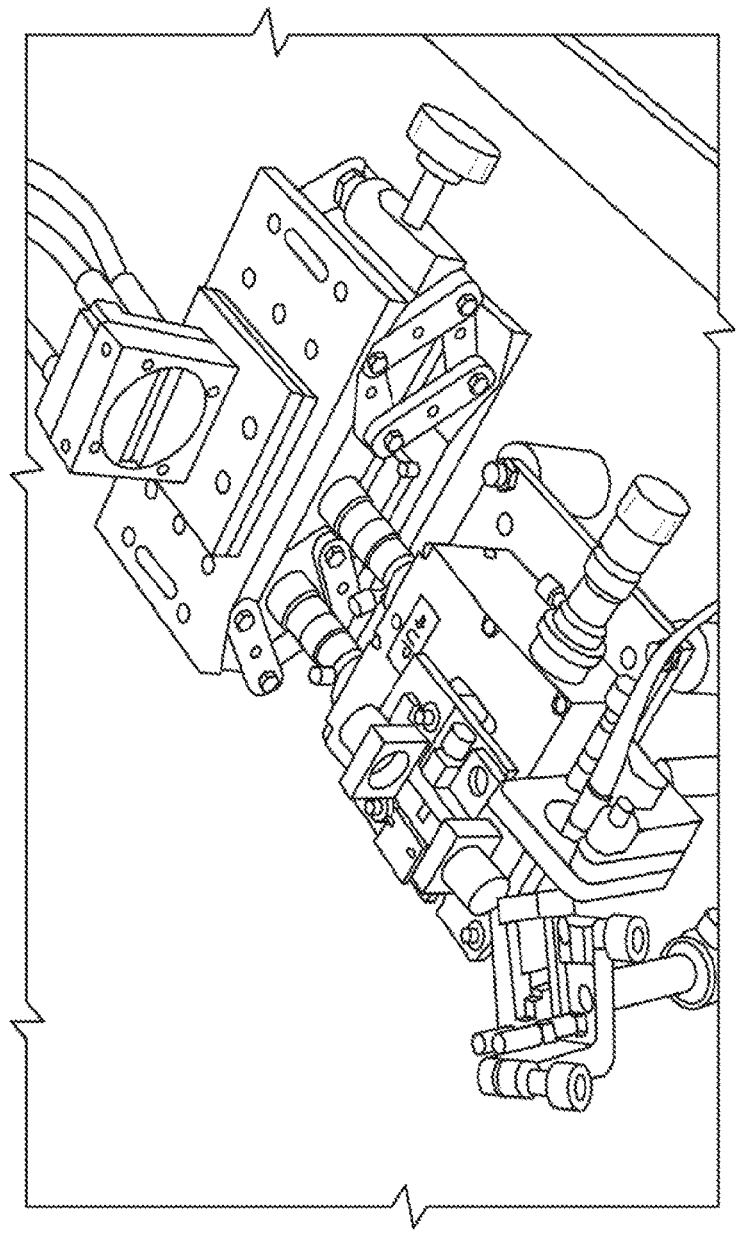
FIG. 18 is a photograph of the exemplary optical arrangement according to an exemplary embodiment of the present disclosure.

FIG. 18 illustrates a photograph of an exemplary optical arrangement according to an exemplary embodiment of the present disclosure. For example, the input infrared laser field can first be dispersed by a transmission grating before being focused by an achromatic lens. The light can then be impinged onto the front surface of the fan-out grating PPLN, and can be up-converted to the visible range. The up-converted light can be collected by a conjugate achromatic lens and detected by a line CCD camera.

Figure 19:
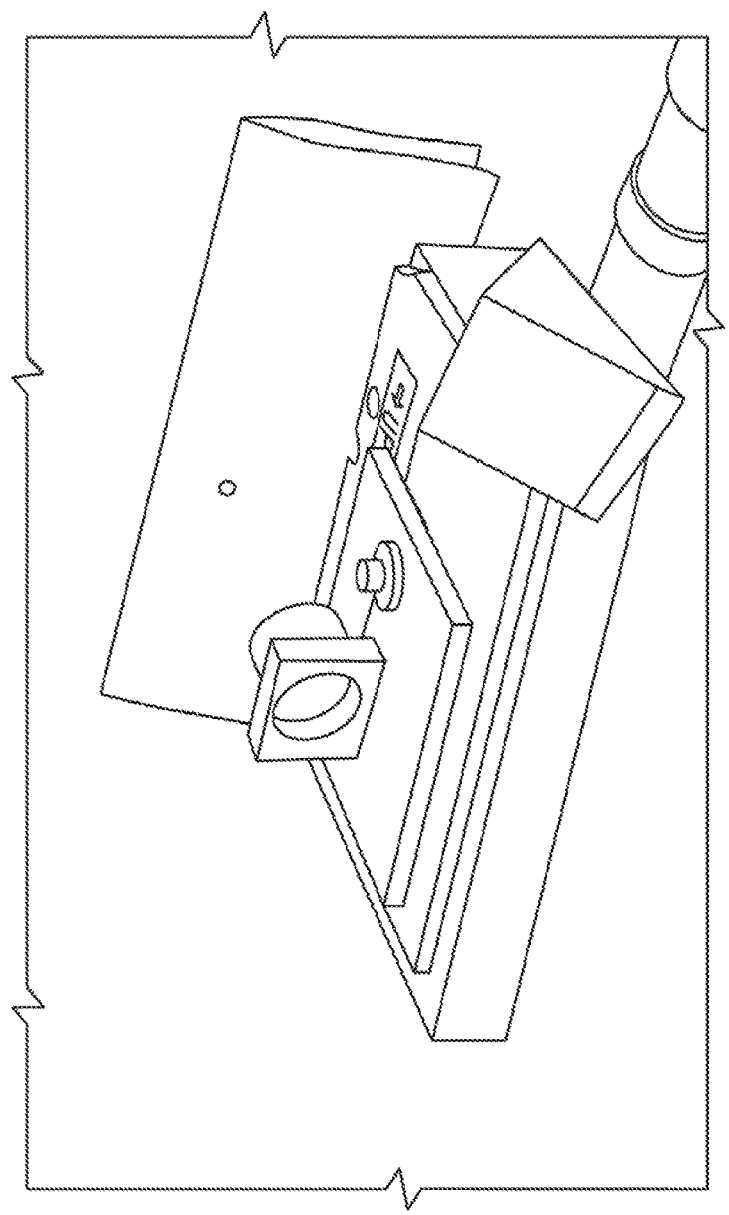
FIG. 19 is a photograph of the dot-like output beam shaped by applying a narrowband input according to an exemplary embodiment of the present disclosure.

FIG. 19 is an exemplary photograph illustrating the exemplary dot-like output beam shape by applying a narrowband input. For example, a Fabry-Perot laser centered at about 1310 nm can be used as the input. As a result, the output beam appears as a dot because only a narrow spectrum of light can be up-converted.

Figure 20:
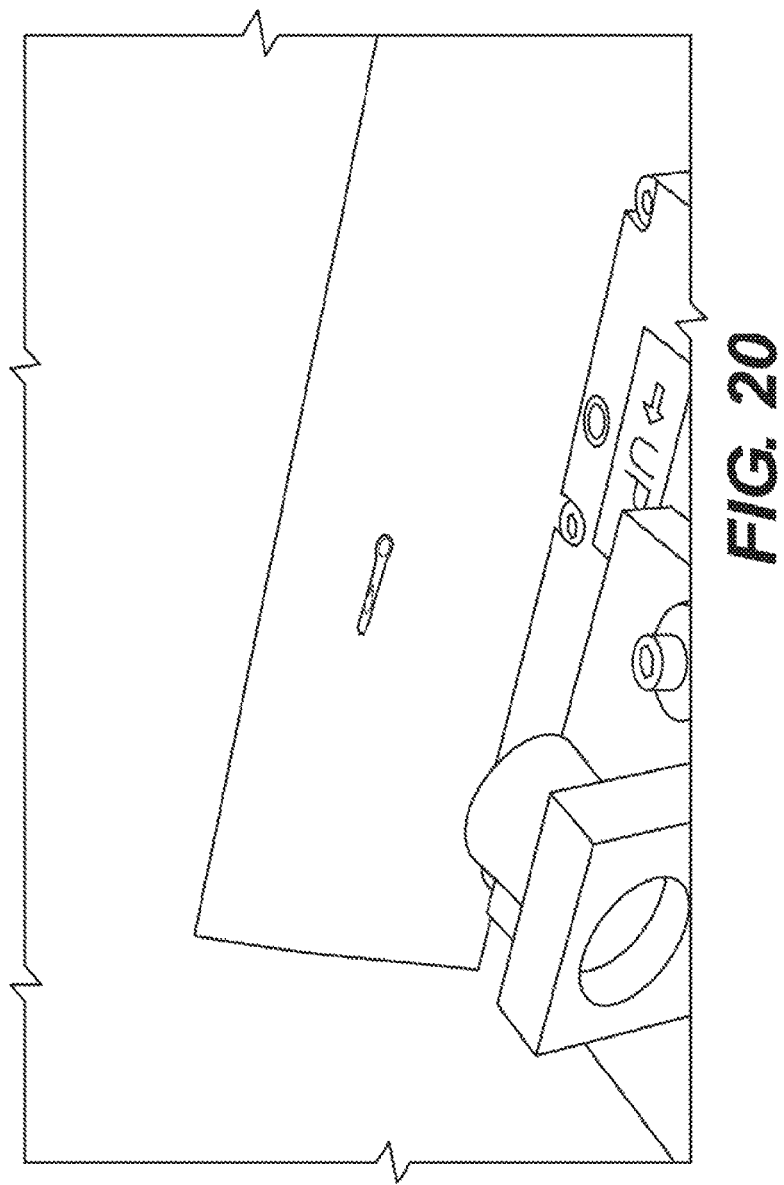
FIG. 20 is a photograph of the line shape output beam by applying a broadband input according to an exemplary embodiment of the present disclosure.

FIG. 20 is an exemplary photograph illustrating the line shape output beam by applying a broadband input. For example, a supercontinuum laser centered at about 1300 nm can be used as the broadband input. After being transmitted by the transmission grating and the achromatic lens pair, the light can be spatially dispersed and sent to the fan-out grating PPLN. By matching the spectrum of the input light with the grating period of the crystal, a broadband up-conversion can be obtained. The bandwidth of the process can be determined by both the input laser spectrum and the variance of the period of the fan-out grating PPLN.

Figure 21:
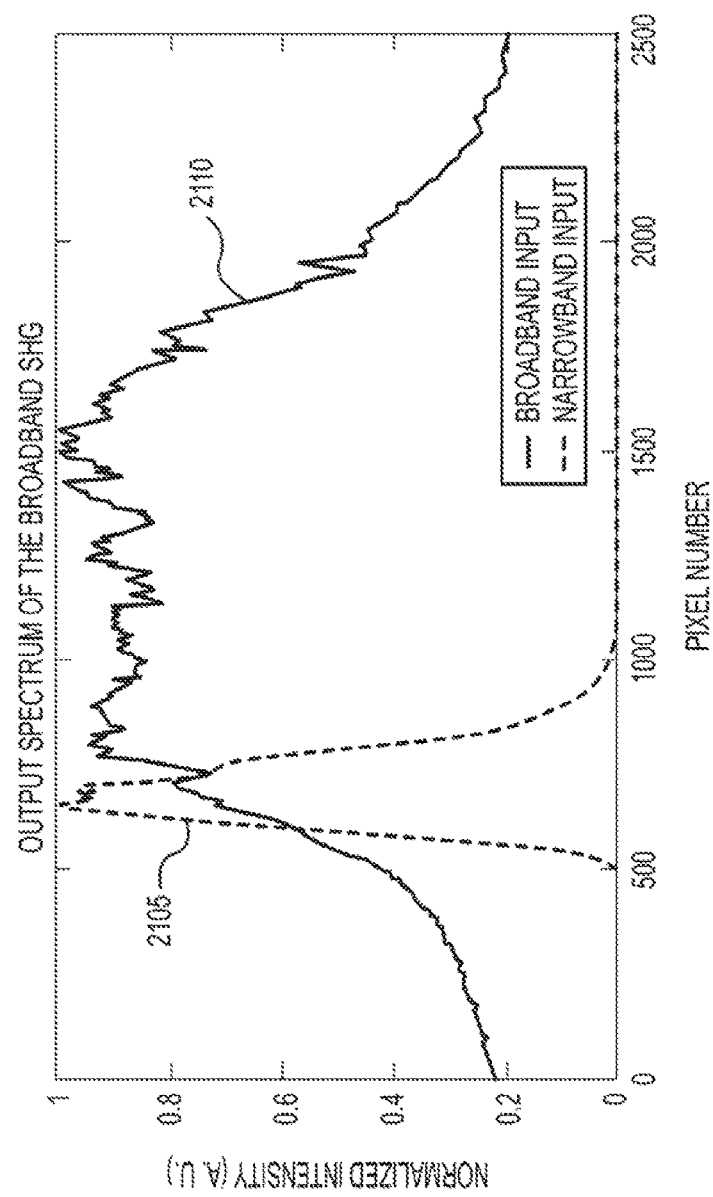
FIG. 21 is a graph illustrating the output spectrum of the exemplary up-conversion of both a narrowband and broadband input according to an exemplary embodiment of the present disclosure.

FIG. 21 is an exemplary graph illustrating the output spectrum of the up-conversion of both a narrowband and broadband input. For example, line 2105 illustrates the output spectrum of a narrowband input (e.g., a Fabry-Perot laser), while line 2110 shows the output spectrum of a broadband input (e.g., a Supercontinuum laser). The FWHM of the visible output can be about 15 nm and about 45 nm for narrowband and broadband input, respectively.

Figure 22A:
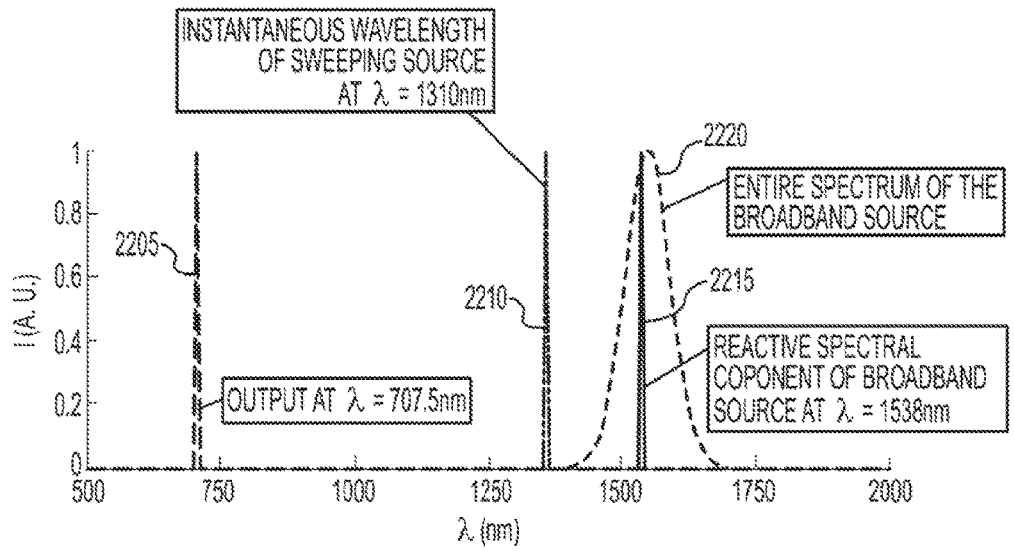
FIGS. 22A and 22B are graphs illustrating the output wavelength of the sum frequency generation versus two inputs according to an exemplary embodiment of the present disclosure.
Figure 22B:
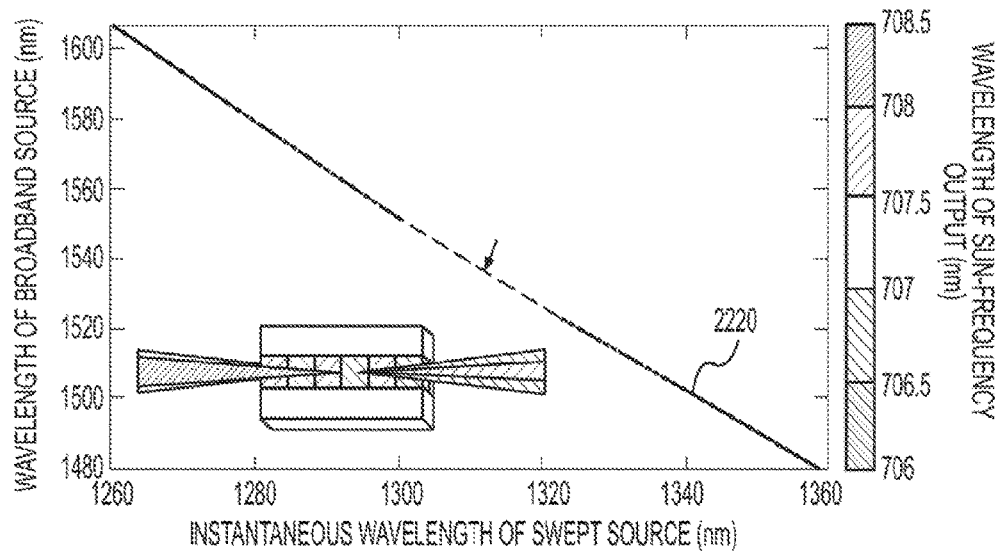

FIGS. 22A and 22B are exemplary graphs illustrating the output wavelength of the sum frequency generation (e.g., element 2205) versus two inputs (e.g., element 2210 and 2215). The horizontal axis gives the wavelength of the wavelength-sweeping source, and the vertical axis gives the wavelength of the pumping broadband source. The sum-frequency components (e.g., element 2220) may only be effectively generated for wavelength pairs that can be colored, which can be due to an imposed conservation of energy and quasi-phase-matching conditions.

Figure 23:
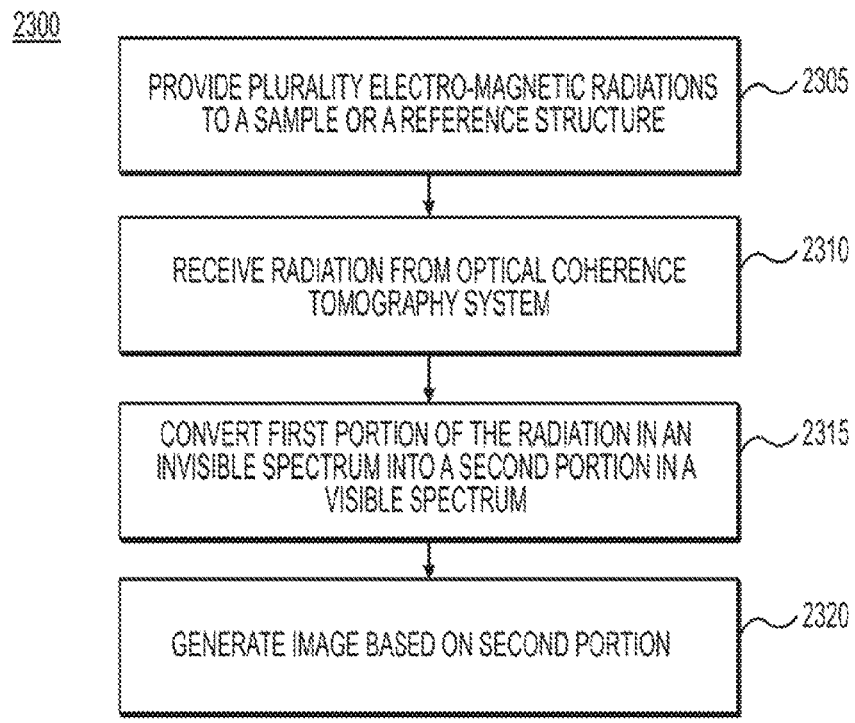
FIG. 23 is a flow diagram of an exemplary method for generating an image according to an exemplary embodiment of the present disclosure.

FIG. 23 shows a flow diagram of an exemplary method 2300 for generating an image according to an exemplary embodiment of the present disclosure, which can be executed by an exemplary system according to an exemplary embodiment of the present disclosure. For example, at procedure 2305, a plurality of electro-magnetic radiations can be provided to a sample and/or to a reference structure. At procedure 2310, radiation from an optical coherence tomography system can be received. A first portion of the radiation from the optical coherence tomography system in an invisible spectrum can be converted in a second portion in the visible spectrum at procedure 2315. At procedure 2320, and image can be generated based on the second portion.

Figure 24:
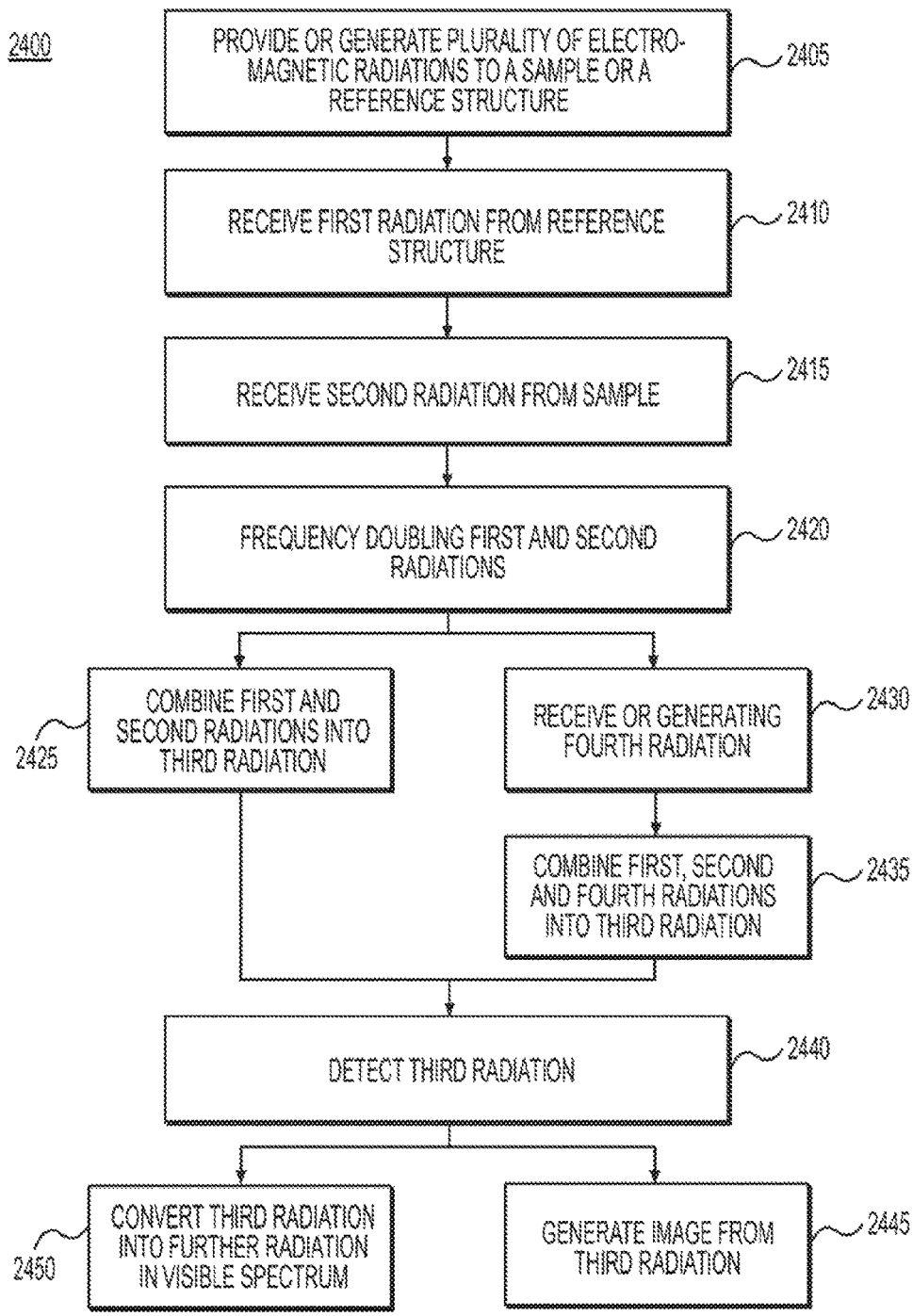
FIG. 24 is a flow diagram of an exemplary method according to an exemplary embodiment of the present disclosure.

FIG. 24 shows a flow diagram of an exemplary method 2400 according to an exemplary embodiment of the present disclosure, which can be executed by an exemplary system according to an exemplary embodiment of the present disclosure. For example, at procedure 2405, a plurality of electro-magnetic radiations can be generated and/or provided to a sample and/or a reference structure. At procedure 2410, a first radiation from the reference structure can be received, and at procedure 2415, a second radiation from the sample can be received. The first and second radiations can optionally be frequency doubled at procedure 2420, and can then be combined into a third radiation at procedure 2425, which can be detected at procedure 2440. Alternatively, a fourth radiation can be generated and/or received at procedure 2430, which can be combined with the first and second radiations at procedure 2436 into the third radiation, which can be detected at procedure 2440. At procedure 2445, an image can be generated. Alternatively, or in addition, the third radiation can be converted into a further radiation in the visible spectrum at procedure 2450.

Figure 25:
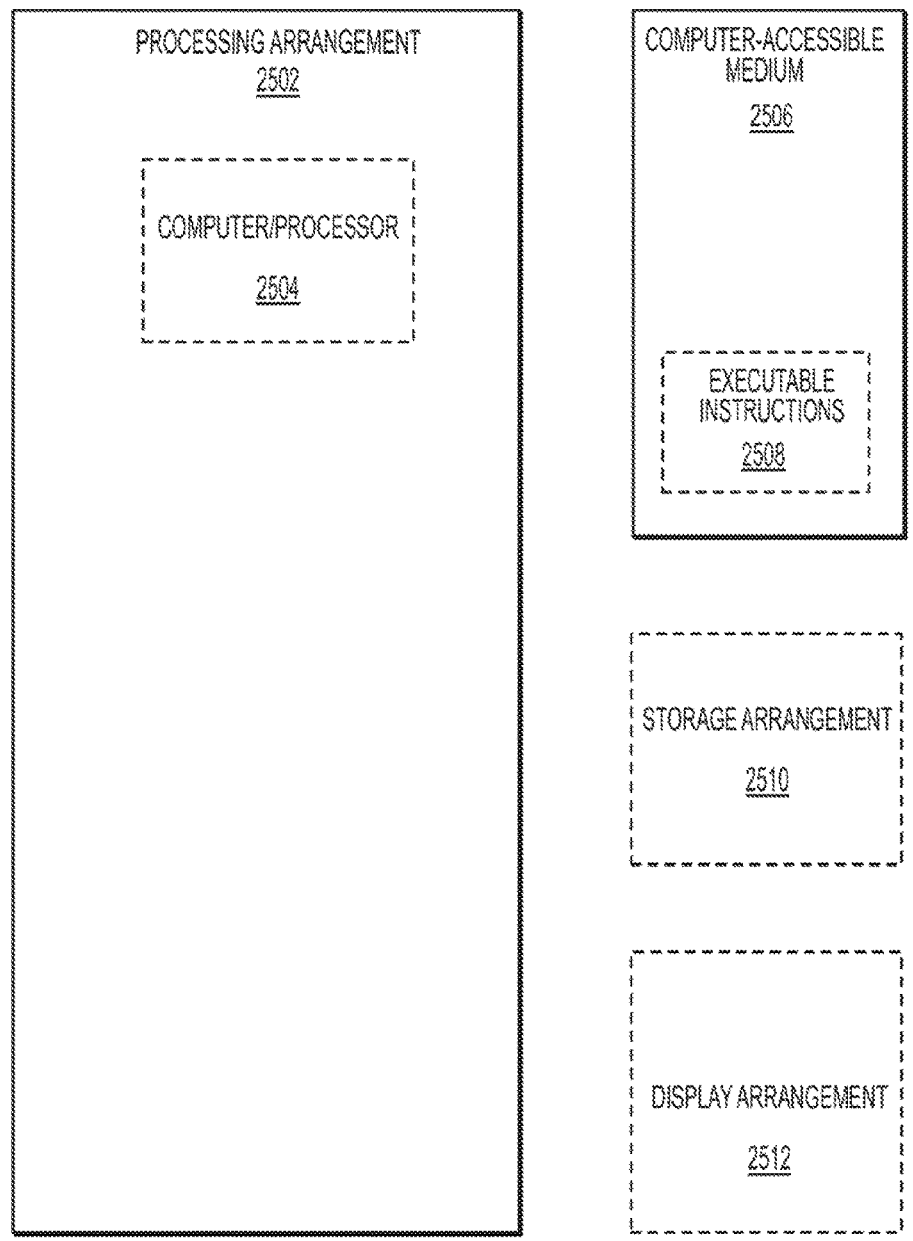
FIG. 25 is an illustration of an exemplary block diagram of an exemplary system in accordance with certain exemplary embodiments of the present disclosure.

FIG. 25 shows a block diagram of an exemplary embodiment of a system according to the present disclosure. For example, exemplary procedures in accordance with the present disclosure described herein can be performed by a processing arrangement and/or a computing arrangement 2502. Such processing/computing arrangement 2502 can be, for example entirely or a part of, or include, but not limited to, a computer/processor 2504 that can include, for example one or more microprocessors, and use instructions stored on a computer-accessible medium (e.g., RAM, ROM, hard drive, or other storage device).

As shown in FIG. 25, for example a computer-accessible medium 2506 (e.g., as described herein above, a storage device such as a hard disk, floppy disk, memory stick, CD-ROM, RAM, ROM, etc., or a collection thereof) can be provided (e.g., in communication with the processing arrangement 2502). The computer-accessible medium 2506 can contain executable instructions 2508 thereon. In addition or alternatively, a storage arrangement 2510 can be provided separately from the computer-accessible medium 2506, which can provide the instructions to the processing arrangement 2502 so as to configure the processing arrangement to execute certain exemplary procedures, processes and methods, as described herein above, for example.

Further, the exemplary processing arrangement 2502 can be provided with or include an input/output arrangement 2514, which can include, for example a wired network, a wireless network, the internet, an intranet, a data collection probe, a sensor, etc. As shown in FIG. 25, the exemplary processing arrangement 2502 can be in communication with an exemplary display arrangement 2512, which, according to certain exemplary embodiments of the present disclosure, can be a touch-screen configured for inputting information to the processing arrangement in addition to outputting information from the processing arrangement, for example. Further, the exemplary display 2512 and/or a storage arrangement 2510 can be used to display and/or store data in a user-accessible format and/or user-readable format.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

What is claimed is:

1. A system, comprising:
    a light source configured to provide a plurality of electro-magnetic radiations to at least one of at least one sample or at least one reference structure;
    a beam splitter configured to combine the at least one first radiation and the at least one second radiation, wherein at least one portion of the at least one second radiation is provided in an invisible spectrum;
    at least one first non-linear optical crystal structure configured to upconvert one of the at least one first radiation or the at least one second radiation;
    at one second non-linear optical crystal structure configured to upconvert another one of the at least one first radiation or the at least one second radiation; and
    a detector configured to receive the unconverted at least one first and second radiations.

2. The system of claim 1, wherein the light source include at least one of a swept-source or a broadband source.

3. The system of claim 2, wherein the at least one of the swept-source or the broadband source is a laser arrangement.

4. The system of claim 1, wherein the at least one first non-linear optical crystal structure is configured to upconvert that at least one first radiation and the at least one second non-linear optical crystal structure is configured to =convert the at least one second radiation.

5. The system of claim 1, wherein the at least one first non-linear crystal and, the at least one second non-linear crystal are a fan-out gratings configurations.

6. The system of claim 5, wherein the fan-out grating configurations are periodically poled lithium niobate (PPLN) fan-out gratings.

7. The system of claim 6, wherein the PPLN fan-out grating configurations are temperature controlled PPLNs.

8. The system of claim 1, further comprising a delay line configured to delay the one of the at least one first radiation or the at least one second radiation while the other one of the at least one first radiation or the at least one second radiation is being upconverted.

9. The system of claim 1, wherein the detector is a linear detector.

10. A method for generating at least one image, comprising:
providing a plurality of electro-magnetic radiations from a plurality of sources to at least one of at least one sample or at least one reference structure;
receiving at least one radiation from at least one optical coherence tomography system (OCT);
converting at least one first portion of the at least one radiation provided in an invisible spectrum into at least one second portion provided in a visible spectrum;
converting at least one third portion of the at least one radiation provided in the invisible spectrum into at least one fourth portion provided in the visible spectrum, wherein the first and third portions are different from one another; and
generating an image based on the at least one second portion and the at least one fourth portion.

11. The method of claim 10, wherein the sources include at least one of a swept-source or a broadband source.

12. The method of claim 10, wherein the at least one first portion is converted into the at least one second portion using a first quasi-phase-matching apparatus, and wherein the at least one third portion is converted into the at least one fourth portion using a second quasi-phase-matching apparatus.

13. The method of claim 12, wherein the first quasi-phase matching apparatus and the second quasi-phase matching apparatus include fan-out grating configurations.

14. The method of claim 13, wherein the fan-out grating configurations are periodically poled lithium niobate fan-out gratings.

15. The method of claim 10, further comprising delaying the at least one second portion while the at least one third portion is converted to the at least one fourth portion.

16. A method, comprising:
generating at least one electromagnetic radiation;
splitting the at least one electromagnetic radiation into at least one first radiation and at least one second radiation;
providing the at least one first radiation to at least one sample and the at least one second radiation to at least one reference structure;
receiving at least one third radiation from the at least one reference structure that is based on the at least one first radiation;
receiving at least one fourth radiation from the at least one sample that is based on the at least one second radiation, wherein at least one portion of the at least one fourth radiation is in an invisible spectrum;
upconverting one of the at least one third radiation or the at least one fourth radiation to a second-harmonic frequency;
frequency doubling another one of the at least one third radiation or the at least one fourth radiation;
combining the upconverted one of the at least one third radiation or the at least one fourth radiation and the frequency doubled one of the at least one third radiation or the at least one fourth radiation into at least one fifth radiation; and
generating at least one image based on the fifth radiation.

17. The method of claim 16, further comprising detecting the at least one fifth radiation prior to generating the at least one image radiation.

18. The method of claim 17, wherein the upconverted one of the at least one third radiation or the at least one fourth radiation and the frequency doubled one of the at least one third radiation or the at least one fourth radiation are combined using a beam splitter.

19. The method of claim 16, wherein the at least one electromagnetic radiation is generated using a swept source laser.

20. The method of claim 16, wherein the at least one fifth radiation is an interference between the upconverted one of the at least one third radiation or the at least one fourth radiation and the frequency doubled one of the at least one third radiation or the at least one fourth radiation.

21. The method of claim 16, further comprising combining the at least one third radiation and the at least one fourth radiation prior to upconverting one of the at least one third radiation or the at least one fourth radiation.

22. The method of claim 21, wherein the at least one third radiation or the at least one fourth radiation is upconverted using at least one fan-out grating configuration.

23. The method of claim 22, wherein the fan-out grating configuration is a periodically poled lithium niobate fan-out grating.

24. The method of claim 16, further comprising delaying the upconverted one of the at least one third radiation or the at least one fourth radiation.

25. The method of claim 16, further comprising absorbing excess power from the fifth radiation using at least one optical stop.

26. The method of claim 16, wherein the at least one electromagnetic radiation is generated using at least one of a swept-source or a broadband source.

* * * * *